US011899200B2

(12) United States Patent
Edwin et al.

(10) Patent No.: US 11,899,200 B2
(45) Date of Patent: Feb. 13, 2024

(54) METHOD AND SYSTEM FOR REDUCING LINE SEPARATION ARTIFACTS IN INTERLACED IMAGE PROJECTION

(71) Applicant: Magic Leap, Inc., Plantation, FL (US)

(72) Inventors: Lionel Ernest Edwin, Hollywood, FL (US); Bjorn Nicolaas Servatius Vlaskamp, Plantation, FL (US); Samuel A. Miller, Hollywood, FL (US); Aaron M. Clarke, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 384 days.

(21) Appl. No.: 17/233,283

(22) Filed: Apr. 16, 2021

(65) Prior Publication Data
US 2021/0302719 A1 Sep. 30, 2021

Related U.S. Application Data

(63) Continuation of application No. PCT/US2019/057039, filed on Oct. 18, 2019.

(60) Provisional application No. 62/747,916, filed on Oct. 19, 2018.

(51) Int. Cl.
G02B 26/10 (2006.01)
G02B 26/08 (2006.01)
G03B 21/00 (2006.01)
H04N 9/31 (2006.01)

(52) U.S. Cl.
CPC ....... G02B 26/101 (2013.01); G02B 26/0833 (2013.01); G03B 21/008 (2013.01); H04N 9/3129 (2013.01); H04N 9/3161 (2013.01)

(58) Field of Classification Search
CPC .............. G02B 26/101; G02B 26/0833; G03B 21/008; H04N 9/3129; H04N 9/3161
See application file for complete search history.

(56) References Cited

U.S. PATENT DOCUMENTS

| 2009/0284622 | A1* | 11/2009 | Wills | H04N 9/3176 |
| | | | | 348/231.99 |
| 2011/0001888 | A1 | 1/2011 | Brown et al. | |
| 2016/0330418 | A1 | 11/2016 | Nakai et al. | |
| 2017/0010473 | A1* | 1/2017 | Ide | G02B 3/0056 |

(Continued)

FOREIGN PATENT DOCUMENTS

CA  3056278 A1  10/2018

OTHER PUBLICATIONS

PCT/US2019/057039, "International Preliminary Report on Patentability", dated Apr. 29, 2021, 9 pages.

(Continued)

Primary Examiner — Michael E Teitelbaum
(74) Attorney, Agent, or Firm — KILPATRICK TOWNSEND & STOCKTON LLP

(57) ABSTRACT

An image display system includes an optical subsystem configured to emit a modulated light beam, and a scanning mirror for generating a reflected light beam that is scanned according to randomly selected or pseudo-randomly selected scan patterns to generate multiple image fields of a multiple interlaced scan image. A plurality of different scan patterns can be cycled through, randomly or pseudo-randomly selected, for the different image fields to reduce artifacts that may be observed while viewing a projected image.

20 Claims, 8 Drawing Sheets

(56) References Cited

U.S. PATENT DOCUMENTS

2018/0120559 A1    5/2018  Yeoh et al.
2018/0152680 A1*   5/2018  Zimmerman ........ H04N 9/3164
2018/0275410 A1    9/2018  Yeoh et al.
2019/0310489 A1*  10/2019  Nothern III ........... H01S 5/4075

OTHER PUBLICATIONS

PCT/US2019/057039, "International Search Report and Written Opinion", dated Mar. 3, 2020, 12 pages.
PCT/US2019/057039, "Invitation to Pay Additional Fees and, Where Applicable, Protest Fee", Jan. 8, 2020, 2 pages.
Tutvid, "2x, 3x, and 4x Split Screens in Primiere Pro (with Animation)", Available Online At: <URL: https://www.youtube.com/watch?v=d8yVxeZOlxA>, 2017, 3 pages.

* cited by examiner

METHOD AND SYSTEM FOR REDUCING LINE SEPARATION ARTIFACTS IN INTERLACED IMAGE PROJECTION

CROSS-REFERENCES TO RELATED APPLICATIONS

This application is a continuation of International Patent Application No. PCT/US2019/057039, filed Oct. 18, 2019, entitled "METHOD AND SYSTEM FOR REDUCING LINE SEPARATION ARTIFACTS IN INTERLACED IMAGE PROJECTION," which claims the benefit of and priority to U.S. Provisional Patent Application No. 62/747,916, filed Oct. 19, 2018, entitled "METHOD AND SYSTEM FOR REDUCING LINE SEPARATION ARTIFACTS IN INTERLACED IMAGE PROJECTION," the entire disclosures of which are hereby incorporated by reference, for all purposes, as if fully set forth herein.

BACKGROUND OF THE INVENTION

Scanning display technology has existed since the development of cathode ray tube (CRT) displays. While most modern liquid crystal displays (LCD) use progressive scan for displaying images and video, CRT displays have historically used both progressive scan as well as interlaced scan. In a progressive scan display, the lines of each frame are drawn in sequence, typically from the top of the display to the bottom of the display. In an interlaced scan display, half of the lines of each frame are drawn in the first field and the other half of the lines of the frame are drawn in a second field. Interlaced scan has been used for a variety of reasons, including increasing the apparent frame rate and decreasing flicker without increasing the video bandwidth. Interlaced displays, however, can suffer from other artifacts that undesirably impact viewability of the image or video.

SUMMARY OF THE INVENTION

Scanning image displays and projection systems may employ a progressive scan or an interlaced scan configuration. Interlaced scan configurations may be desirable to accommodate particular geometries or component operational parameters, to increase a perceived frame rate, and/or to reduce flicker observed by a user. However, interlaced scan configurations may introduce other observational artifacts that may be undesirable and difficult to eliminate, such as line separation artifacts that may be observed by a user while the user is scanning across an image projected by a scanning image display or projection system. Embodiments described herein provide scanning image display systems and projection systems that feature interlaced scan configurations that exhibit reduced observational artifacts that can degrade viewability of images projected using a scanning image display system. In some embodiments, scanning image display systems can employ a multiple interlaced scan configuration and/or a variable scan pattern from image to image.

According to some embodiments, an image projection system comprises an optical subsystem for emitting a modulated light beam. For example, the modulated light beam may be modulated according to a plurality of image fields in sequence. That is, the intensity output of the light beam output by the optical subsystem may follow a pattern that corresponds to a pixel pattern generated by using an output scan pattern or sequence and a rendered frame. Optionally, the optical subsystem includes one or more laser sources, such as three or more individual laser sources arranged in a collinear or substantially collinear configuration for outputting laser light for displaying images using a scanning laser image display or projector.

According to some embodiments, an image projection system may also comprise a scanning mirror positioned to intercept the modulated light beam and generate a reflected light beam. According to some embodiments, an image projection system comprises projection optics positioned to receive the reflected light beam and project a plurality of images. Example projection optics include, but are not limited to, lenses, mirrors, beam splitters, filters, prisms, polarizers, waveguides, diffractive optical elements, windows or any combination thereof.

A scanning mirror may include an actuator configured to adjust an orientation of the scanning mirror according to a scan pattern. A scan pattern may represent an orientation sequence used for the scanning mirror in order to trace projected reflected light across a projection surface in a way to present at least a portion of an image. In a progressive scanning image display, the scan pattern may cycle from left-to-right or from right-to-left such that individual lines of an image are cycled through in sequence from top-to-bottom or from bottom-to-top. Although uncommon, the scan pattern may cycle from top-to-bottom or from bottom-to-top such that individual lines of an image are cycled through in sequence from left-to-right or from right-to-left. In an interlaced scanning image display, a scan pattern may be used to present individual lines, but instead of the individual lines being exactly adjacent to one another to present the image from top-to-bottom in a single pass, spaces between presented lines are included, with multiple top-to-bottom passes used to present individual image fields with a plurality of image fields providing all the lines of the image. Stated another way, in an interlaced scan system, each image comprises a plurality of image fields, with each image field corresponding to a portion of the image. Optionally, each image field of an image is generated from a common rendered frame or from different rendered frames (e.g., a next frame).

The image projection systems and methods described herein may repeatedly display image fields in sequence in a way that projects multiple images. For example, all of the image fields making up a first image may be projected and then all of the image fields making up a second image may be projected. By repeatedly projecting image fields and modulating the light used for projecting the images, video or a sequence of still or fixed images may be projected.

In contrast to conventional interlaced scan projection systems and methods, the image projection systems and methods described herein may employ a technique where different scan patterns may be used for each image field, such that the scan patterns used for the image fields are not exactly replicated from image to image. For example, in some embodiments, a randomly selected scan pattern sequence may be used to project a plurality of image fields in sequence, drawing from a pool of a plurality of different scan patterns. In some embodiments, a pseudo-randomly selected scan pattern sequence may be used to project a plurality of image fields in sequence, drawing from a pool of a plurality of different scan patterns. Optionally, a quasi-randomly selected scan pattern sequence may be used to project a plurality of image fields in sequence, drawing from a pool of a plurality of different scan patterns.

For example, with a fixed number ("k") of different scan patterns available, a randomly selected scan pattern sequence may optionally identify any of the available scan patterns for projecting an image or image field. Once a scan pattern is used for projecting an image field, it may optionally be taken out of the pool of available scan patterns for subsequent image fields until all scan patterns from the pool are selected. Depending on the number of available scan patterns, this may require projecting more than one full image. In some cases, the scan patterns used for the different image fields of an image may be randomly selected as a group, such that a randomly selected sequence of scan patterns together can be used to present appropriate image fields in order to make up the full image.

In a pseudo-randomly selected or quasi-randomly selected scan pattern configuration, rather than a scan pattern being selected by random, a sequence of scan patterns (or groups of scan patterns) may be used, with the sequence being predetermined in a way that achieves sufficient variation in the scan patterns used from image to image to avoid an image from using the same scan pattern as a previous or next image, or even a further next or previous image or two or more previous images or two or more next images, for example. Optionally, a pseudo-randomly selected scan pattern sequence or quasi-randomly selected scan pattern sequence corresponds to a sequence of the plurality of different scan patterns that repeats after multiple images of the plurality of images are projected.

Optionally, the plurality of different scan patterns includes a fixed number of different scan patterns, k. In some implementations, k may be a fixed number that is an integer multiple of a number of image fields that together make up one image. For example, in some cases the plurality of different scan patterns includes twenty different scan patterns. Optionally, when four image fields make up an image, such as in a 4× interlaced image, twenty different scan patterns can mean that each of the different scan patterns can be used once while displaying five images in sequence. Other numbers of different scan patterns and image fields can be used.

A variety of scanning mirrors are useful with the projection systems and projection methods described herein. For example, a scanning mirror may comprise a microelectromechanical system (MEMS) mirror having two independently rotatable axes. In some embodiments, the scanning mirror has a fast oscillation axis and a slow oscillation axis. In some cases, the scanning mirror may have oscillation axes that are equally capable of oscillating at the same frequencies, but may be operated, nevertheless, at different frequencies to achieve projection of an interlaced scan image. Optionally, the scanning mirror comprises two microelectromechanical system (MEMS) mirrors in sequence. Optionally, each MEMS mirror in a sequence has one rotatable axis.

Scanning mirrors can be operated by adjusting the orientation of the mirror using an actuator in a way that directs a reflected beam back and forth across a projection surface in a sequence to present image fields on the projection surface. For example, in some embodiments, each scan pattern corresponds to an orientation sequence for the scanning mirror for projecting the reflected light beam along a path corresponding to an image field. Optionally, an actuator may be configured to adjust the orientation of the scanning mirror according to a first scan pattern of the plurality of different scan patterns while the modulated light beam is modulated according to a first image field and to adjust the orientation of the scanning mirror according to a second scan pattern of the plurality of different scan patterns while the modulated light beam is modulated according to a second image field, with the first and second scan patterns being different. In some cases, an image may be made up of more image fields, such that the actuator may be further configured to adjust the orientation of the scanning mirror according to a third scan pattern of the plurality of different scan patterns while the modulated light beam is modulated according to a third image field, with the first, second, and third scan patterns being different. In some cases, an image may be made up of more image fields, such that the actuator may be further configured to adjust the orientation of the scanning mirror according to a fourth scan pattern of the plurality of different scan patterns while the modulated light beam is modulated according to a fourth image field, with the first scan pattern, the second scan pattern, the third scan pattern, and the fourth scan pattern all being different. Optionally, the first image field, the second image field, the third image field and the fourth image field are generated from a rendered frame corresponding to one image from a plurality of images.

In another embodiment, an image projection system comprises an illumination source configured to emit collimated light, such as laser light; a scanning mirror configured to receive and reflect light from the illumination source, such as a scanning mirror that includes an actuator controllable to induce movement in the scanning mirror about one or more rotational axes thereof to adjust an orientation of the scanning mirror in accordance with one or more scan patterns, a viewing assembly comprising one or more optical components configured to receive and redirect light reflected by the scanning mirror to a user; and control circuitry operatively coupled to the illumination source and the scanning mirror, and configured to display a sequence of a plurality of images of virtual content to the user through the viewing assembly. As one example, the viewing assembly may comprise an augmented or virtual reality display for presenting virtual content to the user.

The control circuitry may be configured to control the illumination source and the scanning mirror by identifying, from among a set of multiple different scan patterns, a plurality of scan patterns for the plurality of images of virtual content in the sequence, respectively, including at least one scan pattern for each of the plurality of images of virtual content in the sequence; and synchronously controlling (i) the illumination source to emit collimated light corresponding to pixels of the plurality of images of virtual content in the sequence, and (ii) the actuator of the scanning mirror to induce a sequence of different movements in the scanning mirror about the one or more rotational axes in accordance with the plurality of scan patterns identified for the plurality of images of virtual content in the sequence, respectively. The sequence of different movements may optionally comprise a sequence of different oscillations in the scanning mirror about a first rotational axis of the one or more rotational axes, with the different oscillations in the sequence offset in phase from each other.

Various different components may be employed in the image projection systems described herein. For example, in some embodiments, the illumination source includes one or more laser sources. Optionally, the scanning mirror comprises a microelectromechanical system (MEMS) mirror. The one or more optical components of the viewing assembly may optionally include one or more lenses, mirrors, beam splitters, filters, prisms, polarizers, waveguides, diffractive optical elements, windows, or any combination of these.

Various techniques may be employed by the image projection systems described herein to improve overall image quality and/or to reduce display or perception artifacts. By using pseudo- or quasi-random selection or identification of scan patterns, scan patterns can be reused at later times for display of subsequent images without encountering display or perception artifacts. For example, in some embodiments, identifying the plurality of scan patterns includes identifying, from among the set of multiple different scan patterns, the plurality of scan patterns previously used by the control circuitry to display images of virtual content. Optionally, the plurality of scan patterns may be identified in a pseudo- or quasi-random manner for the plurality of images of virtual content in the sequence, respectively. Optionally, identifying, from among the set of multiple different scan patterns, the plurality of scan patterns for the plurality of images of virtual content in the sequence includes selecting, from among the set of multiple different scan patterns, a plurality of scan patterns for the plurality of images of virtual content in the sequence, respectively, in a pseudo- or quasi-random manner. Further, by using pseudo- or quasi-random selection or identification of scan patterns, repeated scan patterns may be spaced in time from one another by a sufficient duration to limit display or perception artifacts, such as line separation artifacts.

As described in more detail herein, a large number of different scan patterns may be available for use for displaying different images in the sequence. Use of a large number of different scan patterns may be advantageous for limiting or reducing image artifacts. Each image, however, may be displayed using a subset of different scan patterns from this larger number. For example, the set of multiple different scan patterns optionally comprises a set of k different scan patterns, k representing a value greater than two. The plurality of images in the sequence may be displayed using a quantity of m different scan patterns, m representing a value greater than one and less than or equal to k. The control circuitry may be configured to control the actuator of the scanning mirror to induce a sequence of m different oscillations in the scanning mirror about the first rotational axis in accordance with each of the plurality of scan patterns identified for the plurality of images of virtual content in the sequence, respectively. As an example, the oscillations may have a sinusoidal or substantially sinusoidal shape. Depending on the configuration, k may be an integer multiple of m. Optionally, the m different oscillations are offset in phase from each other by a minimum of about $2\pi/k$ radians. By offsetting the various oscillations, it is possible to limit repeating the same scan patterns when displaying different images, such as images immediately following one another in the sequence.

In some embodiments, the set of k different scan patterns includes a quantity of n different scan patterns identified for each of the plurality of images of virtual content in the sequence, n representing a value greater than one. The control circuitry may be thus configured to control the actuator of the scanning mirror to induce a sequence of n different oscillations in the scanning mirror about the first rotational axis in accordance with the quantity of n scan patterns identified for each of the m different images of virtual content in the sequence, again with the n different oscillations offset in phase from each other by a minimum of about $2\pi/c$ radians. Optionally, larger offsets may be used. For example, the n different oscillations may be offset in phase from each other by about $2\pi/n$ radians. Depending on the configuration, k may be an integer multiple of n. In various embodiments, the n different scan patterns correspond to n different fields of each of the plurality of images of virtual content in the sequence. Optionally, n represents a value greater than or equal to four. Optionally, k represents a value greater than or equal to twenty.

The frequencies for each of the different scan patterns may be the same, which may advantageous for a number of different reasons. Single frequency scan patterns may be generated using a common signal generator for, example. Single frequency scan patterns may also be useful for displaying a stable sequence of images, for example, or for displaying images at a particular (i.e., fixed) frame rate. Optionally, each oscillation induced in the scanning mirror about the first rotational axis in accordance with one of the k different scan patterns comprises oscillation about the first rotational axis at a particular frequency, the particular frequency being common across all oscillations induced in the scanning mirror about the first rotational axis in accordance with one of the k different scan patterns. In some embodiments, each oscillation induced in the scanning mirror about the first rotational axis thereof in accordance with one of the k different scan patterns comprises oscillation about the first rotational axis of the scanning mirror for a particular duration of time, the particular duration of time being common across all oscillations induced in the scanning mirror about the first rotational axis in accordance with one of the k different scan patterns.

The oscillations referred to for the k different scan patterns may correspond to uni-axial oscillations or bi-axial oscillations of the scanning mirror, depending on the scanning mirror configuration employed in the image projection system. In some cases, individual uni-axial scanning mirrors in sequence may be employed to provide a bi-axial configuration. Different oscillation frequencies may be employed for each rotational axis. In some embodiments, the sequence of different movements further comprises a second sequence of different oscillation in the scanning mirror about a second rotational axis of the one or more rotational axes, such as a second rotational axis that is orthogonal to the first rotational axis. Optionally, each movement in the sequence of different movements comprises oscillation about the first rotational axis at a first frequency, and each movement in the sequence of different movements may also comprise oscillation about the second rotational axis at a second frequency. Optionally, the second frequency is different from the first frequency. In some embodiments, first frequency may be greater than the second frequency. Optionally, the first frequency is equal or about equal to or substantially equivalent to a harmonic of the second frequency. In some embodiments, the first frequency is equal to, about equal to, or substantially equivalent to a natural frequency of the scanning mirror.

To control the oscillations of the scanning mirror movement, an actuator may be driven using signals generated by the control circuitry. For example, controlling the actuator of the scanning mirror to induce the sequence of different movements may include applying one or more electrical driving signals to the actuator. The one or more electrical driving signals may include at least one oscillating electrical driving signal or component thereof centered at the first frequency to induce oscillation in the scanning mirror about the first rotational axis. Optionally, different oscillating electrical driving signals of the one or more electrical driving signals are offset in phase from each other. In some embodiments, the one or more electrical driving signals optionally include at least one oscillating electrical driving signal or component thereof centered at the second frequency to induce oscillation in the scanning mirror about the second rotational axis.

In another aspect, image projection methods are described. Images may be projected, for example, using an image projection system described herein. According to some embodiments, a method for projecting an image comprises generating a modulated light beam, such as a modulated light beam that is modulated according to a plurality of image fields in sequence; illuminating a scanning mirror with the modulated light beam to generate a reflected light beam; and projecting the reflected light beam to generate a plurality of images. Each image of the plurality of images may be generated by projecting multiple image fields in sequence. Projecting the plurality of image fields may include adjusting an orientation of the scanning mirror according to a sequence of scan patterns, such as a sequence of scan patterns corresponding to a randomly selected scan pattern of a plurality of different scan patterns or to a pseudo-randomly or quasi-randomly selected scan pattern of the plurality of different scan patterns. By using a randomly, pseudo-randomly, or quasi-randomly selected scan pattern, image observation artifacts can be reduced by using a number of different scan patterns such that the scan patterns are not repeated exactly from image to image. By using different scan patterns for each image in a series of images, a likelihood that a particular image field will exactly overlap with another image field of a previous or next image when a user's eye is moving will be reduced, as compared to a system in which the same exact scan patterns are used for every image.

In another aspect, computer program products for projecting images provided herein. In some embodiments, a computer program product comprises a non-transitory computer readable storage medium containing instructions that, when executed by one or more processors, cause the one or more processors to perform methods described herein. Computer program products of this aspect may be used by or useful with the systems described herein.

Systems described herein may optionally comprise one or more processors and a non-transitory computer readable storage medium in data communication with the one or more processors and including processor executable instructions, which may configure or program the processor to perform specific operations, instructions, or methods. For example, a system may further comprise one or more processors programmed to perform aspects of methods described herein. Computer program products described herein may comprise a non-transitory computer readable storage medium including instructions for execution by a processor to perform aspects of methods described herein. For example, in some embodiments, a computer program product may comprise a non-transitory computer readable storage medium including instructions that, when executed by one or more processors, cause the one or more processors to perform operations including: controlling an optical subsystem so that the optical subsystem emits a modulated light beam modulated according to a plurality of image fields in sequence; and adjusting an orientation of a scanning mirror positioned to intercept the modulated light beam and generate a reflected light beam. Optionally adjusting the orientation of the scanning mirror includes actuating an actuator according to a randomly selected scan pattern of a plurality of different scan patterns or according to a pseudo-randomly or quasi-randomly selected scan pattern of the plurality of different scan patterns in order to direct reflected light through projection optics and project a plurality of images.

According to an embodiment of the present invention, a computer program product comprising a non-transitory computer readable storage medium including instructions that, when executed by one or more processors, cause the one or more processors to perform operations is provided. The operations include controlling an optical subsystem so that the optical subsystem emits a modulated light beam modulated according to a plurality of image fields in sequence and adjusting an orientation of a scanning mirror positioned to intercept the modulated light beam and generate a reflected light beam. Adjusting the orientation of the scanning mirror includes actuating an actuator of the scanning mirror according to sequence of scan patterns. The sequence of scan patterns corresponds to a randomly selected scan pattern sequence of a plurality of different scan patterns, a pseudo-randomly selected scan pattern sequence of the plurality of different scan patterns, or a quasi-randomly selected scan pattern sequence of the plurality of different scan patterns in order to direct reflected light through projection optics and project a plurality of images. Multiple image fields of the plurality of image fields together correspond to an image of the plurality of images.

According to another embodiment of the present invention, an image projection system is provided. The image projection system includes an illumination source configured to emit collimated light and a scanning mirror configured to receive and reflect light from the illumination source. The scanning mirror includes an actuator controllable to induce movement in the scanning mirror about one or more rotational axes thereof to adjust an orientation of the scanning mirror in accordance with one or more scan patterns. The image projection system also includes a viewing assembly comprising one or more optical components configured to receive and redirect light reflected by the scanning mirror to a user and control circuitry operatively coupled to the illumination source and the scanning mirror. The control circuitry is configured to display a sequence of a plurality of images of virtual content to the user through the viewing assembly by: identifying, from among a set of multiple different scan patterns, a plurality of scan patterns for the plurality of images of virtual content in the sequence, respectively, including at least one scan pattern for each of the plurality of images of virtual content in the sequence, and synchronously controlling the illumination source to emit collimated light corresponding to pixels of the plurality of images of virtual content in the sequence. The actuator of the scanning mirror is operable to induce a sequence of different movements in the scanning mirror about the one or more rotational axes in accordance with the plurality of scan patterns identified for the plurality of images of virtual content in the sequence, respectively, wherein the sequence of different movements comprises a sequence of different oscillations in the scanning mirror about a first rotational axis of the one or more rotational axes, and wherein the different oscillations in the sequence are offset in phase from each other.

In embodiment, the set of multiple different scan patterns includes a set of k different scan patterns, k representing a value greater than two. The plurality of images in the sequence are displayed using a quantity of m different scan patterns, m representing a value greater than one and less than or equal to k. In this embodiment, the control circuitry is configured to control the actuator of the scanning mirror to induce a sequence of m different oscillations in the scanning mirror about the first rotational axis in accordance with each of the plurality of scan patterns identified for the plurality of images of virtual content in the sequence, respectively, and the m different oscillations are offset in phase from each other by a minimum of about $2\pi/k$ radians. Moreover, in this embodiment, the set of k different scan patterns can include a quantity of n different scan patterns identified for each of the plurality of images of virtual content in the sequence, n representing a value greater than one and the control circuitry can be configured to control the actuator of the scanning mirror to induce a sequence of n different oscillations in the scanning mirror about the first rotational axis in accordance with the quantity of n scan patterns identified for each of the m different images of virtual content in the sequence, the n different oscillations being offset in phase from each other by a minimum of about 2π/k radians Additional features, benefits, and embodiments are described below in the detailed description, figures, and claims.

DETAILED DESCRIPTION OF SPECIFIC EMBODIMENTS

Described herein are scanning image display system that incorporate a multiple-interlaced scanning configuration in which individual images are displayed by projecting multiple image fields in sequence. The projection of the individual image fields in each individual image in a series of images may not be performed in exactly the same way, but may be done in a way such that the patterns by which the image fields are drawn in images projected before or after one another are different from image to image. By projecting images in a sequence in this way, observation artifacts can be reduced.

Scanning image display systems, such as a laser projection display, may operate similar to a CRT display, but instead of a beam of electrons interacting with a phosphor screen, beams of laser light may impinge on a projection surface. The laser light beams may be scanned across the screen to display each line of a video frame or field.

Figure 1A:
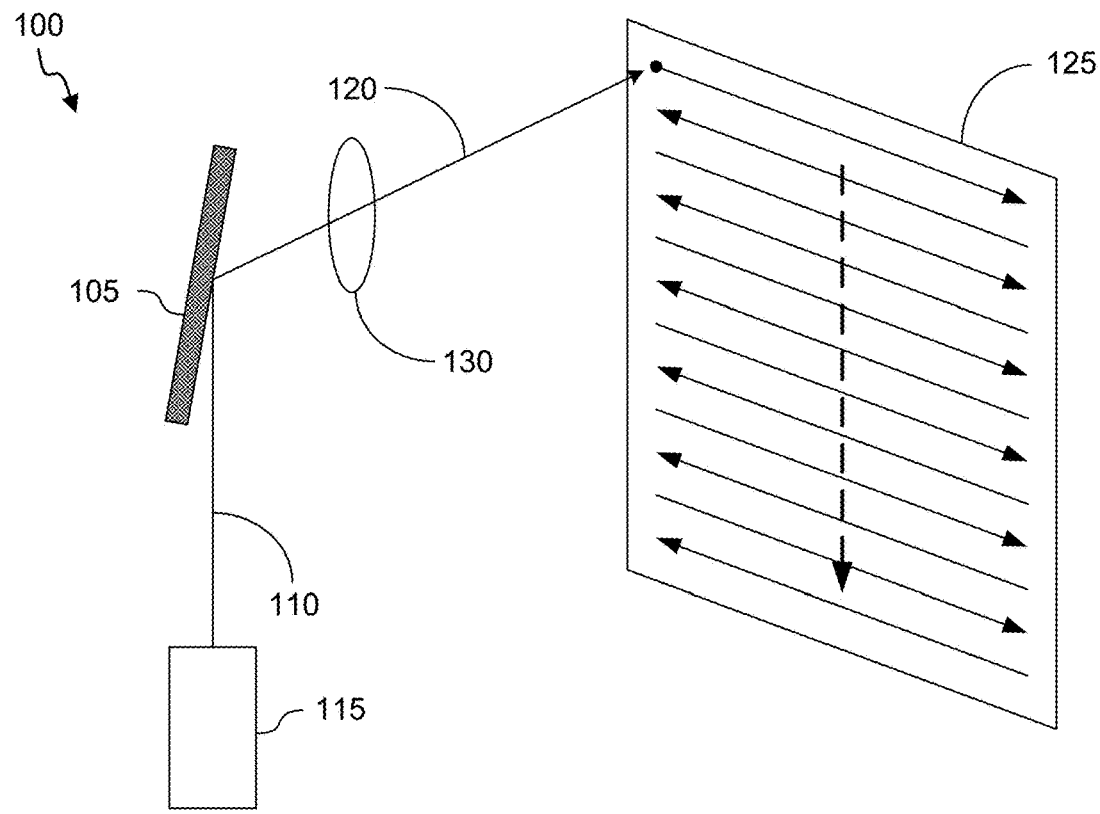
FIG. 1A and FIG. 1B provide simplified schematic diagrams illustrating a progressive scan image display system.
Figure 1B:
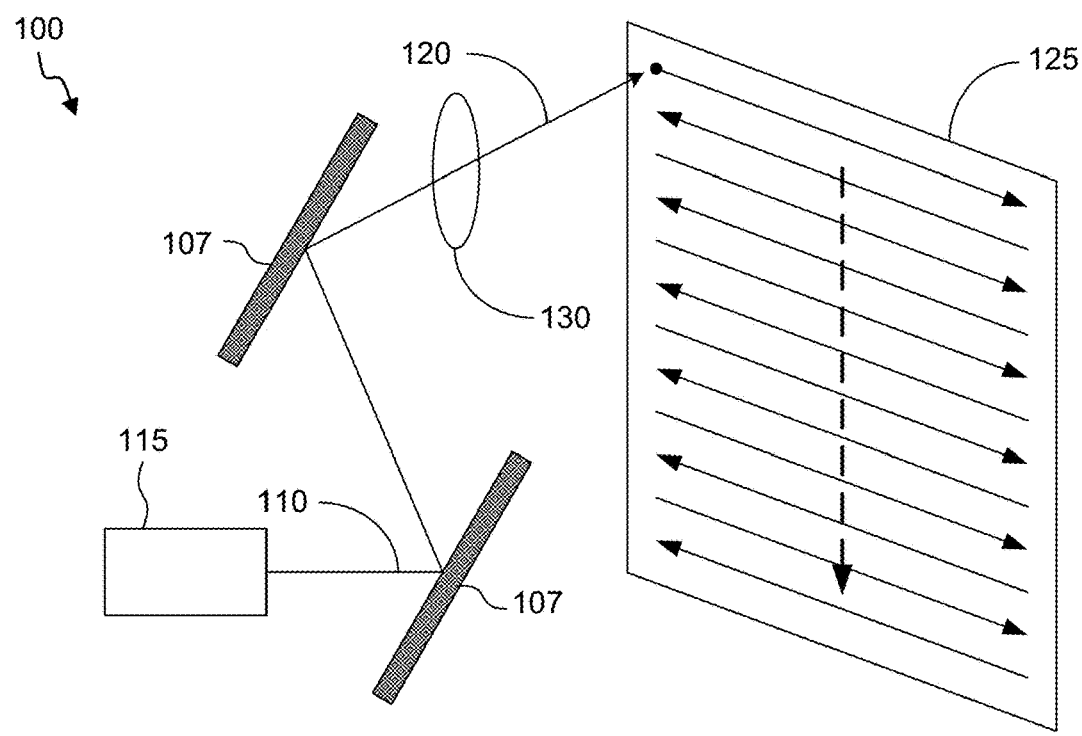

FIGS. 1A and 1B provide simplified schematic diagrams illustrating example image display systems. In FIG. 1A, scanning display system 100 includes a scanning mirror 105 that receives a modulated light beam 110 generated by an optical subsystem 115 and reflects a reflected light beam 120 for projection onto a projection surface 125 through one or more projection optics 130. In some implementations, one or more projection optics 130 may correspond to one or more optical components of a viewing assembly through which one or more images of virtual content may be displayed to a user. In these implementations, such one or more optical components may be configured to receive and redirect light reflected by the scanning mirror 105 to one or two of the user's eyes. Scanning mirror 105 may be a biaxial mirror (i.e., two-dimensionally adjustable mirror), permitting orientation of the mirror along two separate dimensions to trace reflected light beam 120 across the projection surface 125.

The scanning display system 100 of FIG. 1B operates similarly, but instead of a single scanning mirror 105, multiple scanning mirrors 107 are independently oriented to trace reflected light beam 120 across the projection surface 125 upon being projected by projection optics 130. Scanning mirrors 107 may, for example, be uniaxial mirrors (i.e., one-dimensionally adjustable mirrors). Such a configuration may be advantageous, in some embodiments, as uniaxial mirrors 107 may be simpler to construct and more robust than biaxial mirror 105, while retaining the same ability to provide two-dimensional scanning. In some cases, available uniaxial mirrors may exhibit scanning frequencies in excess of those available in biaxial mirrors.

Projection surface 125 may be a surface or screen for displaying or projecting the image or may be a virtual projection surface. In some cases, projection surface 125 can be or include a diffraction grating, a waveguide, or other elements that can direct portions of light received on the projection surface along another direction. Examples of optical components that may be included as part of projection surface 125 and/or projection optics 130 are described in detail in U.S. patent application Ser. No. 15/796,669 filed on Oct. 27, 2017, published on May 3, 2018 as U.S. Publication No. 2018/0120559, and U.S. patent application Ser. No. 15/927,808 filed on Mar. 21, 2018, published on Sep. 27, 2018 as U.S. Publication No. 2018/0275410, both of which are incorporated herein by reference in their entireties.

To display an image frame, the reflected light beam 120 may be traced across projection surface 125 by adjusting orientations of scanning mirror(s) 105, 107 according to a scan pattern. The scan pattern may be represented by the trace the reflected light beam 120 takes across the projection surface 125.

Figure 1C:
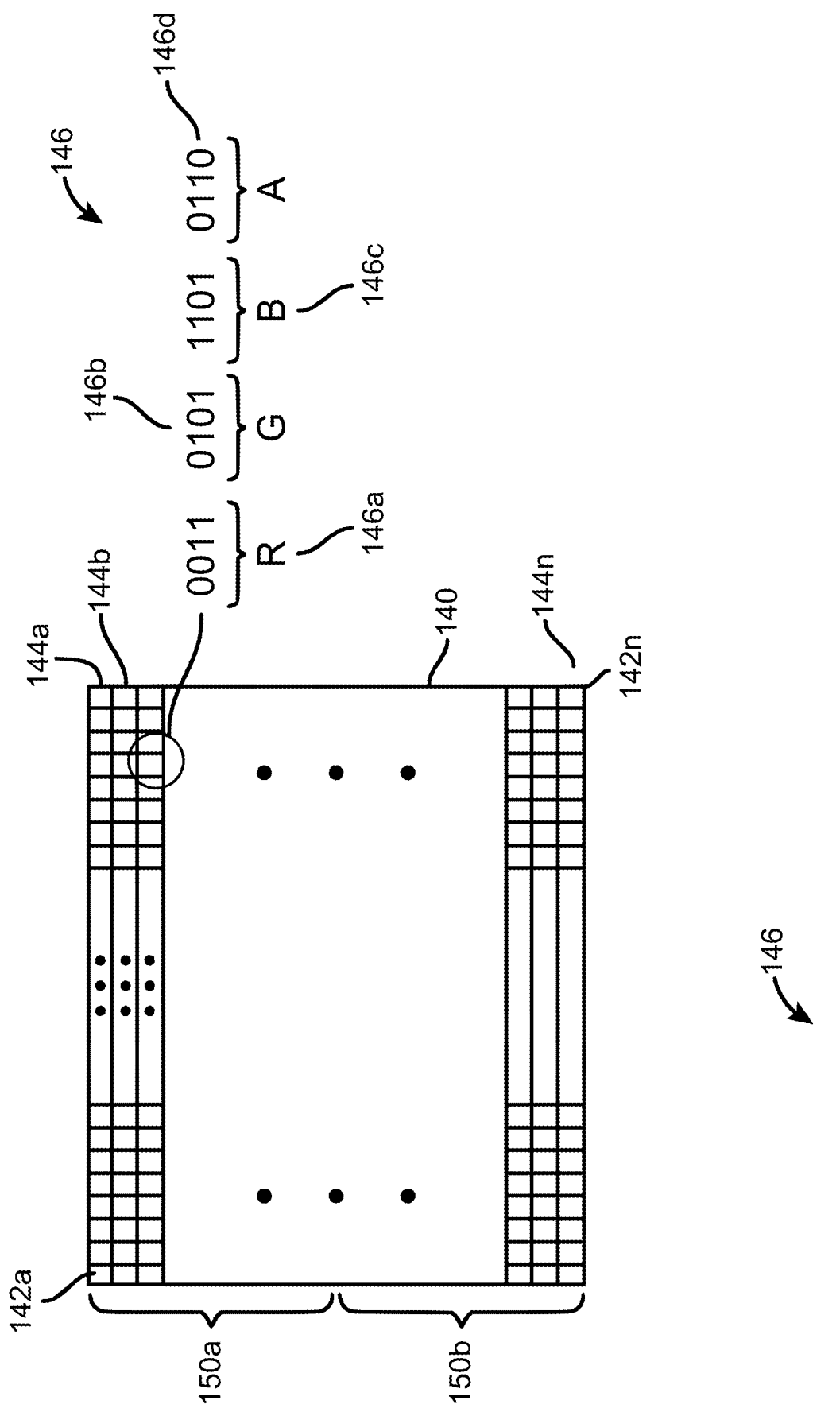
FIG. 1C provides a schematic illustration of an example image frame of pixel information or data that specifies pixel information to generate an image.

FIG. 1C shows an image frame 140 of pixel information or data that specifies pixel information or data to present an image, for example, an image of one or more virtual objects. The image frame 140 may, for example, represent an image frame displayed by the scanning display system 100 of FIGS. 1A and 1B. The image frame 140 includes a plurality of cells, schematically illustrated with cells individually identified as cells 142a-142n (only two cells called out individually, and collectively referred to herein as cells 142), representing each pixel. The image frame 140 includes a plurality of lines, schematically illustrated as sequences of cells arranged in rows or lines 144a, 144b-144n (three lines called out individually, and collectively referred to herein as lines 144), illustrated as extending horizontally across the drawing sheet in FIG. 1C. As described in further detail below, the image frame 140 may also include one or more image fields 150a-150b. FIG. 1C employs ellipsis to represent missing information, such as cells or lines that have been omitted for clarity of illustration.

Each cell 142 of the image frame 140 may specify values (collectively 146) for each of a plurality of colors for the respective pixel to which the cell corresponds and/or intensities. For instance, the image frame 140 may specify one or more values for red 146*a*, one or more values for green 146*b* and one or more values for blue 146*c* for each pixel. The values 146 may be specified as binary representations for each of the colors, for instance a respective 4 bit number for each color. Each cell 142 of the image frame 140 may additionally include an amplitude or radial value 146*d* that specifies an amplitude or radial dimension for each pixel. In some implementations, one or more of the scanning display systems described herein, such as the scanning display system 100 of FIGS. 1A and 1B, may leverage such pixel information in conjunction with specific scan pattern geometries to display the image frame 140 to a user through synchronous control of one or more illumination sources and scanning mirrors.

In FIGS. 1A and 1B, reflected light beam 120 is traced across the projection surface 125 in a progressive scan configuration, where each pixel of the image frame 140 is presented sequentially from top to bottom in alternating directions in a single pass to form a raster scan image. For example, the presentation may start at the upper left corner and traverse right across a first line until the end of the line is reached, and then traverse from right to left in a next line down. In some implementations, the presentation may be temporarily blacked out or "blanked" while returning from the end of one line to the start of the next line. This process repeats line-by-line until the bottom line is completed, for example at the bottom leftmost pixel. With the image frame 140 being complete, a new frame is started, again returning to the top most line of the next frame. Again, the presentation may be blanked while returning from the bottom to the top to present the next frame. The scan pattern used for the progressive scan images projected onto projection surface 125 shown in FIG. 1A and FIG. 1B may include a higher frequency horizontal motion and a lower frequency vertical motion.

It will be appreciated that, although the scan patterns depicted in FIG. 1A and FIG. 1B in follows a repeating left-to-right and right-to-left motion, embodiments are contemplated where the light beam may be actively drawing pixels during motion along one direction and modulated to low or no intensity, also referred to herein as "blanking," during motion the other direction, such that each line of a projected image is drawn along the same direction (e.g., left-to-right) by the active motion but not drawn during the blanking motion. Configurations employing blanking lines may be interchanged with configurations employing fully active left-to-right and right-to-left motion repetitive motion, in some embodiments.

Optical subsystem 115 may include an illumination source, such as a source of collimated light. For example, optical subsystem 115 may include one or more laser sources for generating laser light. In some embodiments, three laser sources may be used to generate three colors (e.g., red, green, and blue) for projection of a full color image. In some embodiments, optical subsystem 115 may also include control circuitry including electronic hardware components (e.g., amplifiers, power supplies, processors, signal generators, etc.) for driving and modulating the light source for generation of the modulated light beam 110. Such control circuitry may further include electronic hardware components (e.g., amplifiers, power supplies, processors, signal generators, signal modulation circuitry, motor controllers, etc.) for adjusting an orientation of the scanning mirror(s) 105, 107. The orientation of the scanning mirror may, in some examples, be adjusted by generating and applying one or more electrical driving signals to one or more actuators or motors of the scanning mirror, which may in turn serve to induce movement (e.g., oscillation) in the scanning mirror about one or more rotational axes thereof (e.g., fast oscillation axis, slow oscillation axis, etc.). In some implementations, some or all of the electronic hardware components of the abovementioned control circuitry may physically reside elsewhere in the scanning display system 100. It will be appreciated that the illumination source may be driven in a way that modulates the output light beam in coordination with orientation of the scanning mirror(s) so that light of appropriate intensities/colors is projected onto the projection surface at a corresponding position to form an image. In some cases, optical subsystem 115 and scanning mirror(s) 105, 107 may be replaced, at least in part, by a scanning light source that directly provides a scannable light beam.

Referring again to FIG. 1C, in some examples, the image frame 140 may include a single image field. In other examples, the image frame 140 may comprise two, or even more image fields 150*a*-150*b*. The image frame 140 illustrated in FIG. 1C shows two image fields 150*a*-150*b*. The pixel information for a complete first image field 150*a* of the image frame 140 may be specified before the pixel information for the complete second image field 150*b*, for example occurring before the pixel information for the second image field 150*b* in an array, an ordered list or other data structure (e.g., record, linked list). The first image field 150*a* may, for example, include pixel information for at least a first scan pattern and the second image field may include pixel information for at least a second scan pattern.

In some embodiments, one or more of the scanning display systems described herein may employ interlaced scan patterns in which lines from different image fields are interlaced. For example, the scan pattern(s) of the second image field 150*b* may be interlaced with the scan pattern(s) of the first image field 150*a*. When presenting lines of the first image field 150*a*, the pixel information for the first image field 150*a* may, for example, be used for the odd numbered lines only, while the pixel information for the second image field 150*b* may, for example, be used for the even numbered lines only. As such, all of the lines of the first image field 150*a* of the image frame 140 may, for example, be presented before the lines of the second image field 150*b*. For example, the first image field 150*a* may be presented using the pixel information of the first image field 150*a* to sequentially present a first line, a third line, a fifth line, and so on, and then the second image field 150*b* of the image frame 140 may be presented following the first image field 150*a*, by using the pixel information of the second image field 150*b* to sequentially present a second line, a fourth line, a sixth line, and so on. As described in further detail below, interlacing of scan patterns may be efficiently achieved with phase shifts. In some implementations, additional image fields may follow the second image field 150*b*. The number of image fields or scan patterns can be greater than two, for example three, four, eight, sixteen, or more.

Figure 2A:
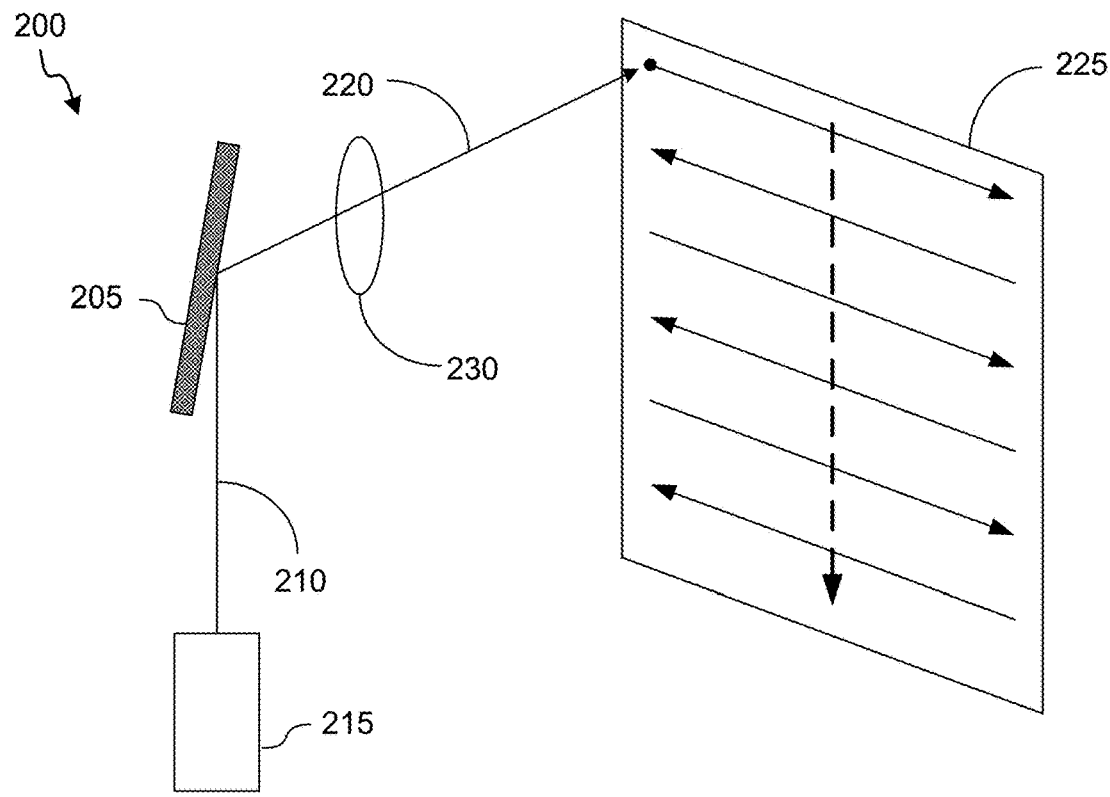
FIG. 2A and FIG. 2B provide simplified schematic diagrams illustrating an interlaced scan image display system according to some embodiments.
Figure 2B:
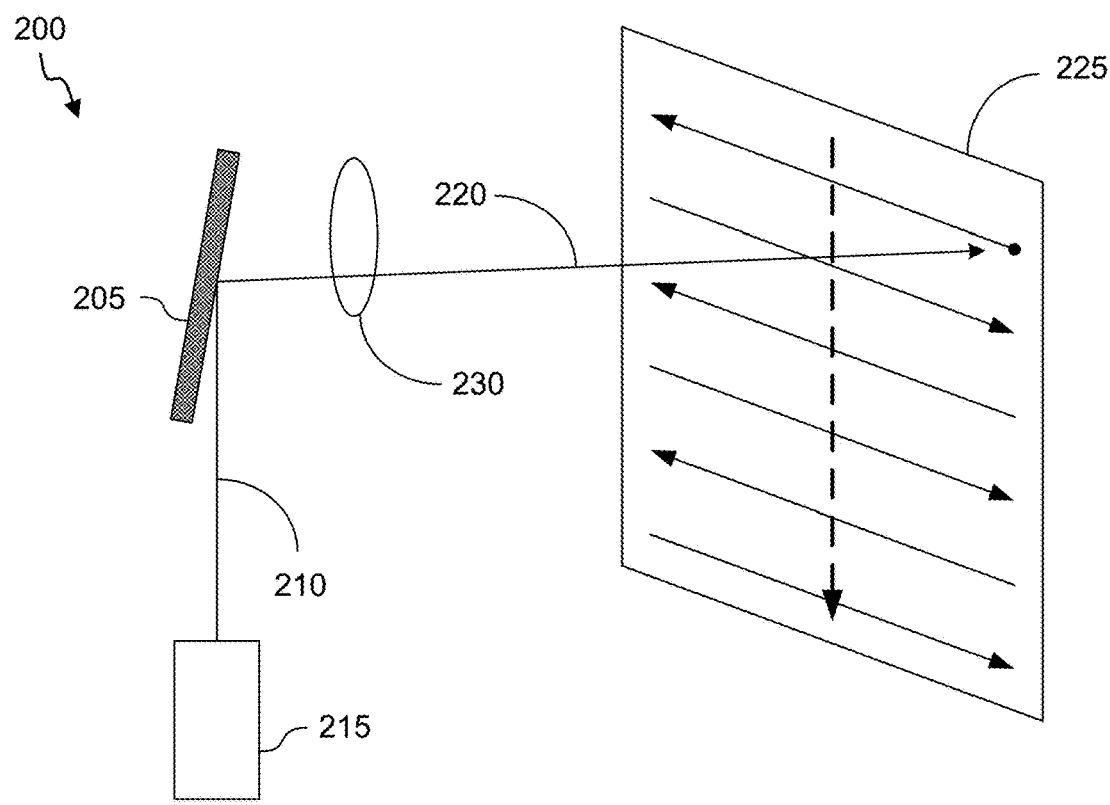

FIGS. 2A and 2B depicts a scanning display system 200 configured to present image frames using interlaced scan patterns. In FIGS. 2A and 2B, scanning display system 200 includes a scanning mirror 205 that receives a modulated light beam 210 generated by an optical subsystem 215 and reflects a reflected light beam 220 for projection onto a projection surface 225 by way of projection optics 230. Although a single scanning mirror 205 is illustrated, which may be a two-dimensionally actuated mirror, multiple scanning mirrors may alternatively be used, permitting orientation of the mirror along separate dimensions to trace reflected light beam 220 across the projection surface 225. Alternatively, a directly scannable light beam may be used.

In FIG. 2A, a first image field is presented on the projection surface 225 and in FIG. 2B, a second image field is presented on the projection surface 225, offset from the first image field. In sequence, the two image fields may together make up a single image. The first and second image fields presented by the scanning display system 200 of FIGS. 2A and 2B may, for example, be similar or analogous to the first and second image fields 150a, 150b described above with reference to FIG. 1C. As illustrated in FIGS. 2A and 2B, the two image fields are vertically offset from one another and are presented along opposite orientations (e.g., starting from left to right in FIG. 2A and starting from right to left in FIG. 2B).

It will be appreciated that the configurations depicted in FIGS. 1A, 1B, 2A, and 2B are merely exemplary and that other configurations and/or components in addition to those shown may be incorporated into a scanning display system. For example, a scanning display system may optionally include projection optics positioned to receive a reflected light beam and magnify and/or focus the reflected light beam. Optionally or additionally, other optical elements may be positioned in optical communication with any of the elements illustrated in FIGS. 1A, 1B, 2A, and 2B, such as, but not limited to, lenses, mirrors, beam splitters, filters, prisms, polarizers, waveguides, diffractive optical elements, windows or any combination thereof. Optical sensors may also optionally be included in a scanning display system, such as to provide feedback regarding light beam intensity and/or scanning mirror orientation.

An optical subsystem may modulate a modulated light beam according to the output needed to present an image or image field across a projection surface. For example, the timing of modulation of a modulated light beam may be synchronized with the position of the reflected light beam, the orientation of the scanning mirror(s), and/or a scan pattern, such that the intensity of the reflected light beam matches or is coordinated with position on the projection surface in order to present an appropriate image or image field. As mentioned above with reference to FIG. 1C, for a multi-field image, such as depicted in FIGS. 2A-2B, each image field may contain position and intensity information from a single rendered frame with the multiple image fields together making up the overall image. In this way, a field-wise modulated light beam may be generated by the optical subsystem.

In some embodiments, the light beam is modulated by adjusting the intensity of each color component of the light beam during each of a succession of time periods to a value that is based on a pixel color component value of a particular pixel in a succession of pixels from a rendered image. For example, a green pixel may have high green intensity and low blue or red intensity. A white pixel may have high green, blue, and red intensities, while a gray pixel may have lower green, blue, and red intensities. Each of the succession of pixels has corresponding angular coordinate in the orientation dimensions of the scanning mirrors, analogous to Cartesian coordinates of pixels an LCD display panel. Simultaneously, while the modulated light beam is being modulated based on particular pixel color component values, the light beam is deflected to the angular coordinates of the corresponding pixel of the image through adjustment of the orientation of the scanning mirror.

Figure 3A:
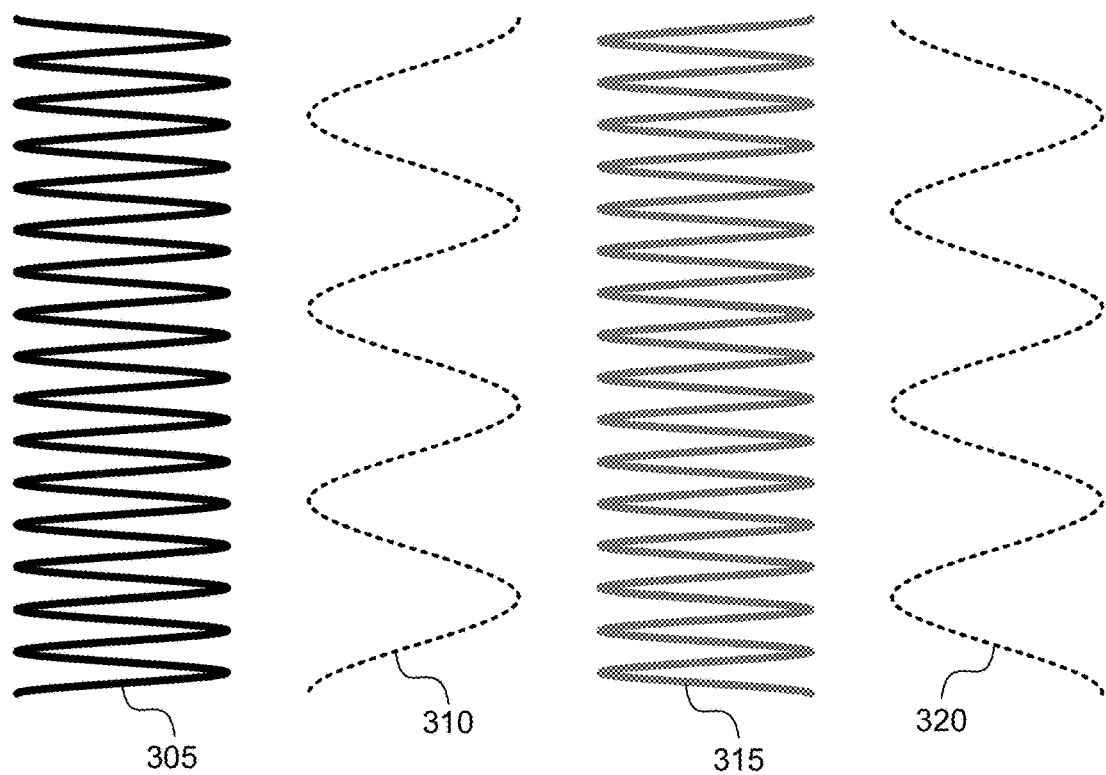
FIG. 3A provides schematic diagrams illustrating scan patterns for an interlaced scan configuration for displaying an image.

In order to appropriately orient the light beam, an actuator of the scanning mirror may be adjusted according to a scan pattern to deflect the reflected beam to the correct position on the projection surface. A scan pattern may correspond to an orientation sequence for one or more scanning mirrors used to project reflected light along a path corresponding to an image or image field. Scan patterns may be represented, for example, by the resultant path for the reflected light, as illustrated in FIG. 3A. FIG. 3A shows several scan patterns used, for example, for presenting an interlaced scan image by way of multiple image fields, as depicted in FIGS. 2A and 2B. A first scan pattern 305 shows the path for a reflected beam starting from left to right for presenting a first image field from top to bottom, similar to FIG. 2A. First scan pattern 305 may correspond to a sinusoidal wave or Lissajous curve with a horizontal scan frequency greater than a vertical scan frequency. The scan patterns are schematically illustrated in FIG. 3A with a relatively low frequency for illustrative purposes. Similar illustrative scan patterns are also depicted in FIGS. 3B, 5A, 5B, and 6. The actual scan patterns used in scanning image projection systems, however, may exhibit relatively high frequencies, such as in the 10-200 kHz range, for example. After completion of first scan pattern 305, the scanning mirror(s) may be optionally oriented according to a first retrace pattern 310, such as in order to reorient the scanning mirror(s) in preparation for presenting a second image field from top to bottom, starting from left to right. Following first retrace pattern 310, the scanning mirror(s) may be oriented according to a second scan pattern 315 for presenting a second image field from top to bottom, starting from right to left. After completion of second scan pattern 315, the scanning mirror(s) may be optionally oriented according to a second retrace pattern 320, such as in order to reorient the scanning mirror(s) in preparation for presenting a subsequent image field for the next frame from top to bottom. First retrace pattern 310 and second retrace pattern 320 are illustrated as dashed curves to depict that, during orientation of the scanning mirror(s) according to first retrace pattern 310 and second retrace pattern 320, the modulated light beam may be "blanked" or modulated to have a minimum (e.g., zero) intensity so as not to impact the appearance of a previous or subsequent image field, such as drawn according to first scan pattern 305 or second scan pattern 315. Patterns 305, 310, 315, and 320 may be repeated in order to display a fixed or video image over a multi-frame duration.

Figure 3B:
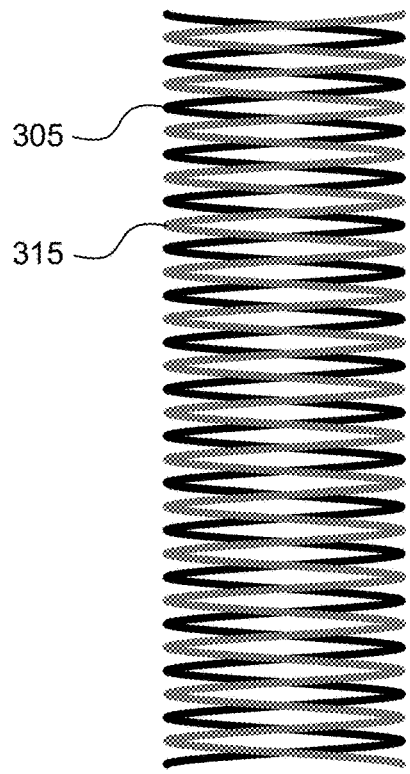
FIG. 3B provides a schematic diagram illustrating overlapping scan patterns for an interlaced scan configuration for displaying an image.

When two image fields are used to make up a full image, as in FIGS. 2A and 2B, the full image may be referred to herein as a 2× interlaced image or generated using a 2× interlaced scan. FIG. 3B shows the overlap of first scan pattern 305 and second scan pattern 315 used to generate a 2× interlaced image. In FIGS. 3A and 3B, first scan pattern 305 and second scan pattern 315 are depicted with different grey levels to allow better distinction of the scan patterns in the figures, but it will be appreciated that the intensities of the modulated light beam used to present the corresponding image fields may be modulated in time to appropriately generate the full image according to a rendered image. When used for displaying a video signal, the two image fields in a 2× interlaced image may represent a single video frame.

Figure 4:
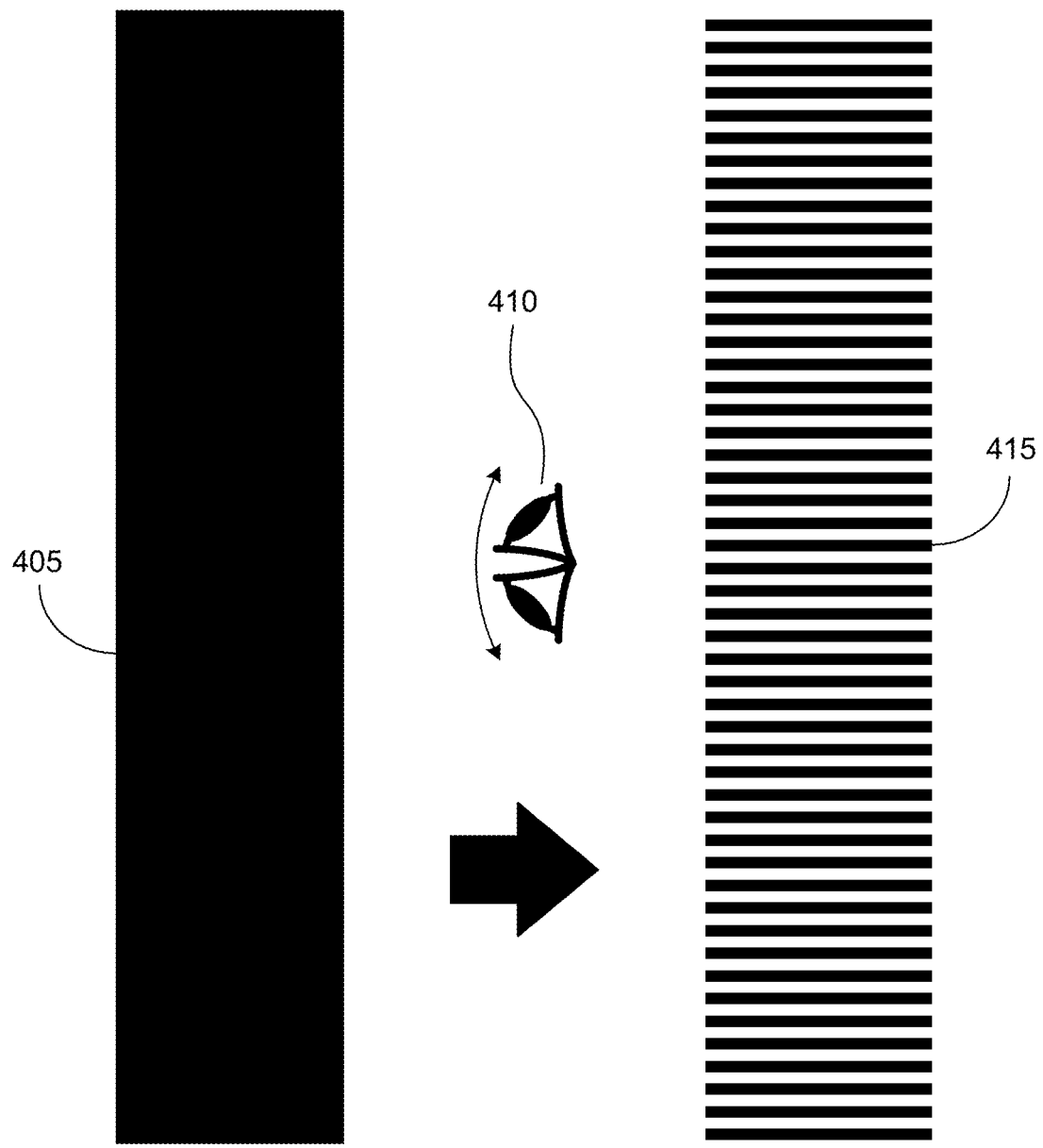
FIG. 4 provides a schematic illustration of an example image displayed using an image display system and an apparent view of artifacts present in the displayed image.

FIG. 4 provides an example image 405 projected using a 2× interlaced scan, corresponding to a solid colored bar. Although illustrated in FIG. 4 as a black bar, it will be appreciated that example image 405 may represent another image, such as a uniformly colored image (e.g., red, orange, white, etc.). When viewed from a fixed or stationary eye position, the image may appear as expected, with the appearance being that of a solid colored bar. When a viewer's eye 410 is scanned vertically across the example image 405, however, the observed image 415 can include artifacts. For example, line separation artifacts can be observed when the user's eye is scanned vertically along a smooth pursuit or when the user's eye saccades from one point in the image to a vertically displaced point in the image. Line separation artifact may be generated when a user's eye moves in time such that the scan pattern of one image field appears to overlap with the scan pattern of a previous image field. Line separation artifacts may be undesirable and may impact the quality of the observed image and may appear as a vertical separation or spacing between adjacent lines in a projected image. It will be appreciated that observed image 415 is schematically illustrated to exaggerate the artifacts that can be observed in the projected image and that, in an actual projected image, the line separation effect may appear, in some embodiments, such that a projected image may appear to have a combing effect.

The present invention provides techniques for reducing line separation artifacts. Similar to the description provided above with reference to FIGS. 3A and 3B, when more image fields are used to make up a full image, the full image may be referred to herein as a "n"-times or nx interlaced image, where n represents the number of individual image fields that together make up the full image. For example, when four image fields are used, the image may be referred to as a 4× interlaced image. When used for displaying a video signal, the four image fields in a 4× interlaced image may represent a single video frame. Advantageously, multiple scan patterns may be nested by shifting a phase between each successive ones of the scan patterns. In some embodiments, the phase difference between scan patterns may be a function of the total number of scan patterns which will be employed. In some implementations, the different scan patterns used to project an interlaced image may be offset in phase by about by 2π/n radians. For example, the four different scan patterns used for projecting a 4× interlaced image may be offset in phase by about π/2 radians (or 90 degrees).

Figure 5A:
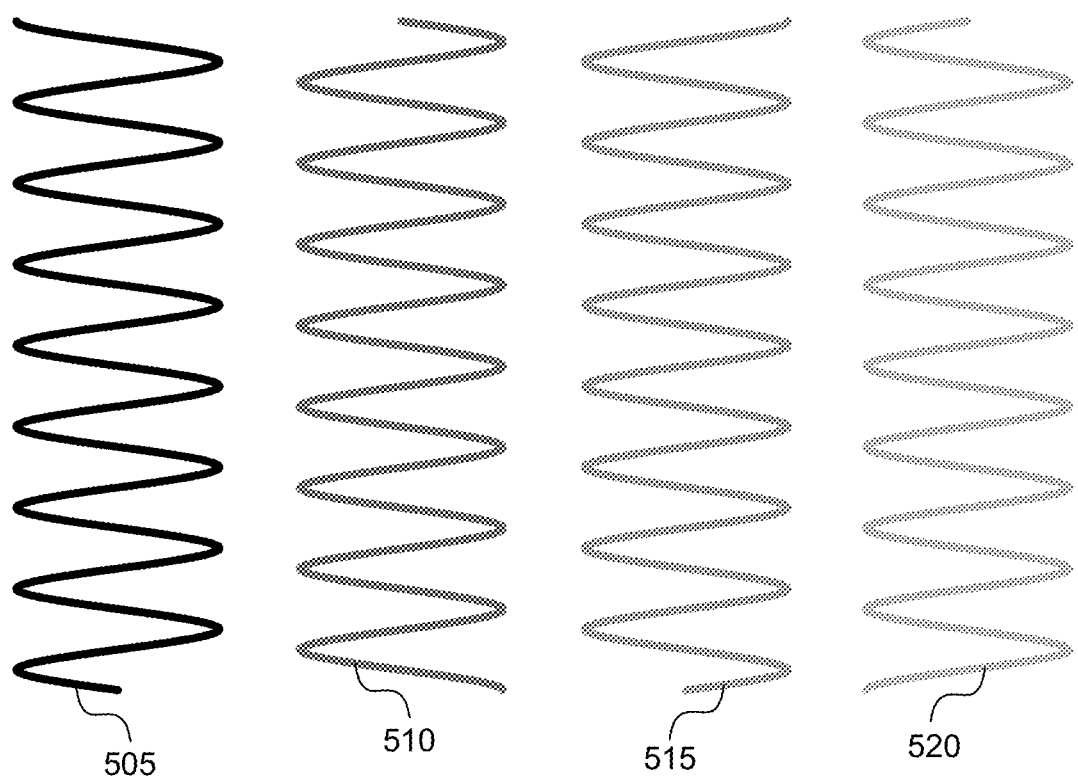
FIG. 5A provides schematic diagrams illustrating scan patterns for an interlaced scan configuration for displaying an image.
Figure 5B:
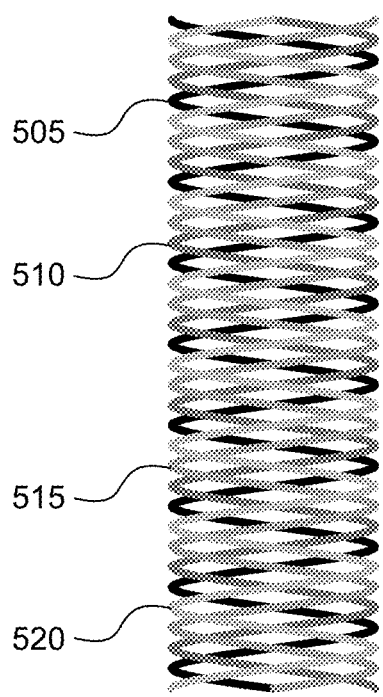
FIG. 5B provides a schematic diagram illustrating overlapping scan patterns for an interlaced scan configuration for displaying an image.

FIG. 5A provides an schematic illustration of four different scan patterns 505, 510, 515, and 520 that may be used to project a 4× interlaced image. Additional scan patterns may be used for projecting a 4× interlaced image, but are not depicted in FIG. 5A, such as for returning a scanning mirror to an orientation at the top of an image, similar to retrace patterns 310 and 320, during which an intensity of the modulated light beam may be blanked or minimized (e.g., set to zero) so as not to impact the appearance of a previous or subsequent image field. FIG. 5B shows the overlap of the active portions of first scan pattern 505, second scan pattern 510, third scan pattern 515, and fourth scan pattern 520 used to generate a 4× interlaced image. In FIGS. 5A and 5B, scan pattern 505, 510, 515, and 520 are depicted with different grey levels to allow better distinction of the scan patterns in the figures, but it will be appreciated that the intensities of the modulated light beam used to draw the corresponding image fields may be modulated in time to appropriately generate the full image according to a rendered image.

It will be appreciated that scan patterns that do not include fully active left-to-right motion and right-to-left motion may be employed for some embodiments. For example, each scan pattern 505, 510, 515, and 520 may optionally include a portion of the scan pattern during which the intensity of the modulated light beam may be blanked or minimized (e.g., set to zero. Such a configuration may optionally be useful so as not to create overlapping lines of intensity during projection of the 4× interlaced image or to minimize edge effects at left/right edges of the presented image. In some cases, blanked portions of scan patterns 505, 510, 515, and 520 are comparable to horizontal blanking intervals in a raster scanning cathode ray tube display.

A multiple-interlaced image may be useful for reducing line separation artifacts. The rate at which an eye may be smoothly pursuited before line separation artifacts are observed may be increased with higher levels of interlacing. Line separation artifacts, however, may not be completely eliminated by use of a 4× interlaced scan. For example, the rate of smooth pursuiting may be increased, as compared to a 2× interlaced scan, for example, before line separation artifacts are observed, but line separation artifacts may still be observed when a user saccades from top to bottom or bottom to top.

To further reduce image artifacts in an interlaced scan image projection system, a plurality of different scan patterns may be used and varied from image to image. For example, the orientation of the scanning mirror may be scanned according to randomly selected scan patterns or according to pseudo-randomly or quasi-randomly selected scan patterns from the plurality of different scan patterns. In a pseudo-randomly or quasi-randomly selected scan pattern scheme, a fixed number of scan patterns, k, may be used and allowed to repeat after a set number of images ("m"). By not repeating the same scan patterns between time adjacent images, the likelihood that an image field will overlap with an image field from a previous or next image while a user's eye is moving will be reduced. In this way, at least a number of different scan patterns equal to or greater than three times a number of fields in the full image may be useful, as this allows separation of repeated use of the same scan pattern by at least two images. In some cases, the number of different scan patterns may be equal to the number of image fields needed to make up five separate images. In the case of a 4× interlaced scan, for example, at least 20 different scan patterns may be used. In some cases, the order in which scan patterns are used in a pseudo-random or quasi-random selection scheme may be allowed to repeat after all of the different scan patterns have been used, which may occur after multiple separate images/frames are projected.

In a randomly selected scan pattern scheme, a fixed number of different scan patterns may be used and these different scan patterns may be randomly selected one-by-one for each image field. In some cases, scan patterns that are used may be removed from the selection pool for subsequent scan patterns until all of the different scan patterns are used. In this way, each different scan pattern may not be repeated until a set number of other different scan patterns are used, reducing the likelihood that scan patterns in an image will overlap with scan patterns in a previous or next image while a user's eye is moving.

Figure 6:
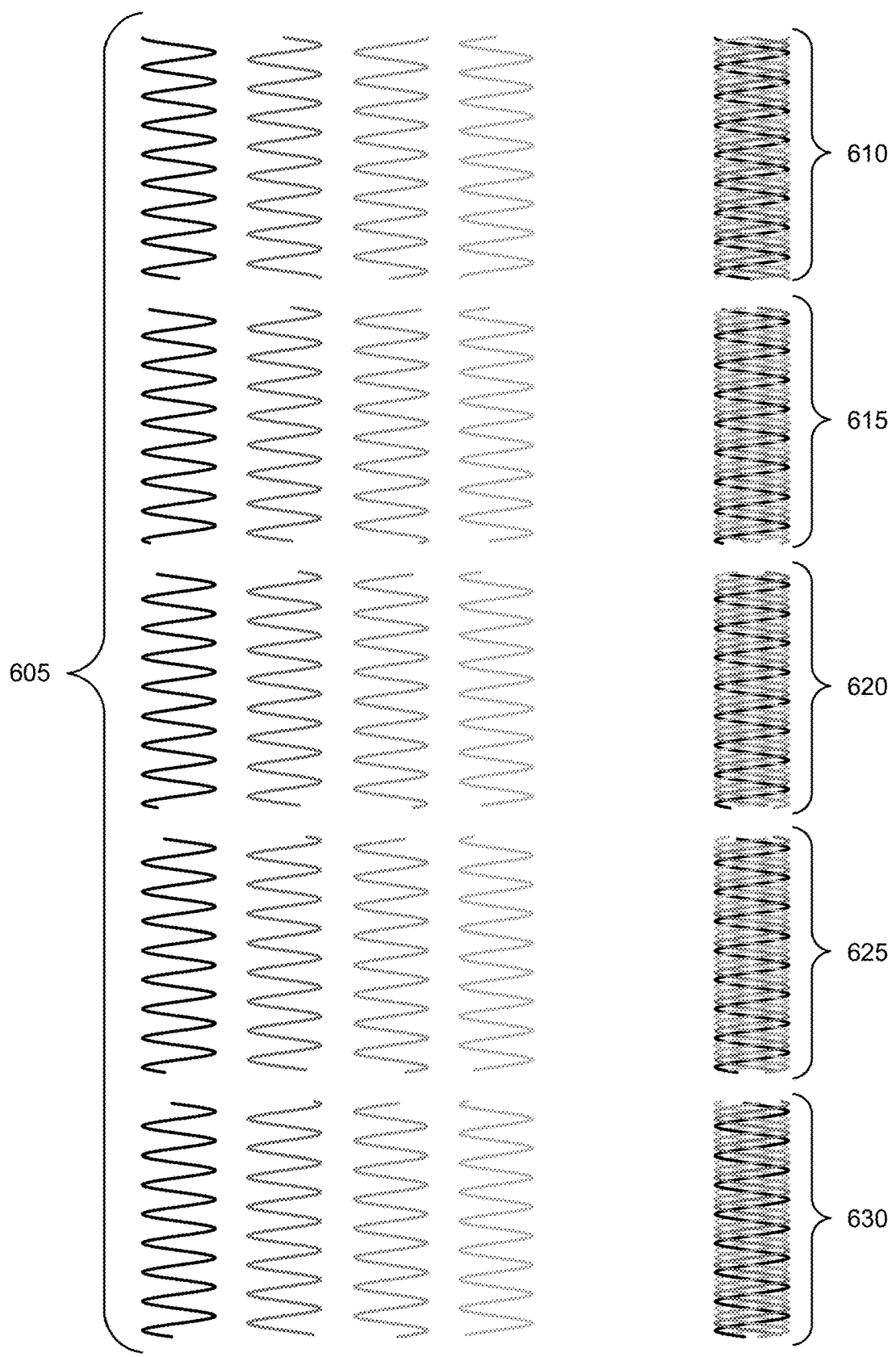
FIG. 6 provides a schematic diagram illustrating pseudo-random scan patterns for an interlaced scan configuration for displaying an image.

FIG. 6 illustrates an example of a pseudo-randomly selected scan pattern selection scheme. In FIG. 6, twenty different scan patterns 605 are illustrated. It will be appreciated that the illustrated scan patterns 605 are merely exemplary and that other different scan patterns may be utilized. Groups of four different scan patterns 605 are selected for projection as individual image fields of five different 4× interlaced images, where overlapping scan patterns 610, 615, 620, 625, and 630 are shown. The different scan patterns displayed for the individual images fields of a particular 4× interlaced image are illustrated as having starting points that are horizontally offset or vertically shifted from one another. Stated another way, the sinusoidal curves of the different scan patterns displayed for the individual images fields of a particular 4× interlaced image are illustrated as phase shifted relative to other scan patterns. In this way, the different scan patterns from image to image will have slight offsets with respect to the previous two and next two frames, resulting in a lower likelihood that scan patterns from different image fields of neighboring images will appear to overlap during movement of the user's eye in viewing the projected image sequence. In some implementations, the different scan patterns 605 may be offset in phase from each other by a minimum of about by $2\pi/k$ radians. For example, twenty different scan patterns may be offset in phase by a minimum of about $\pi/10$ radians (or 18 degrees). In some embodiments, the different scan patterns 605 may be non-uniformly offset in phase from each other. For example, phase differences between the different scan patterns 605 may vary in accordance with a probability distribution or other mathematical function. It follows that phase differences in scan patterns also correspond to phase differences in the oscillating electrical driving signals generated and applied to the scanning mirror to induce movement in the scanning mirror, as well as phase differences in the resulting physical movements/oscillations of the scanning mirror.

Figure 7:
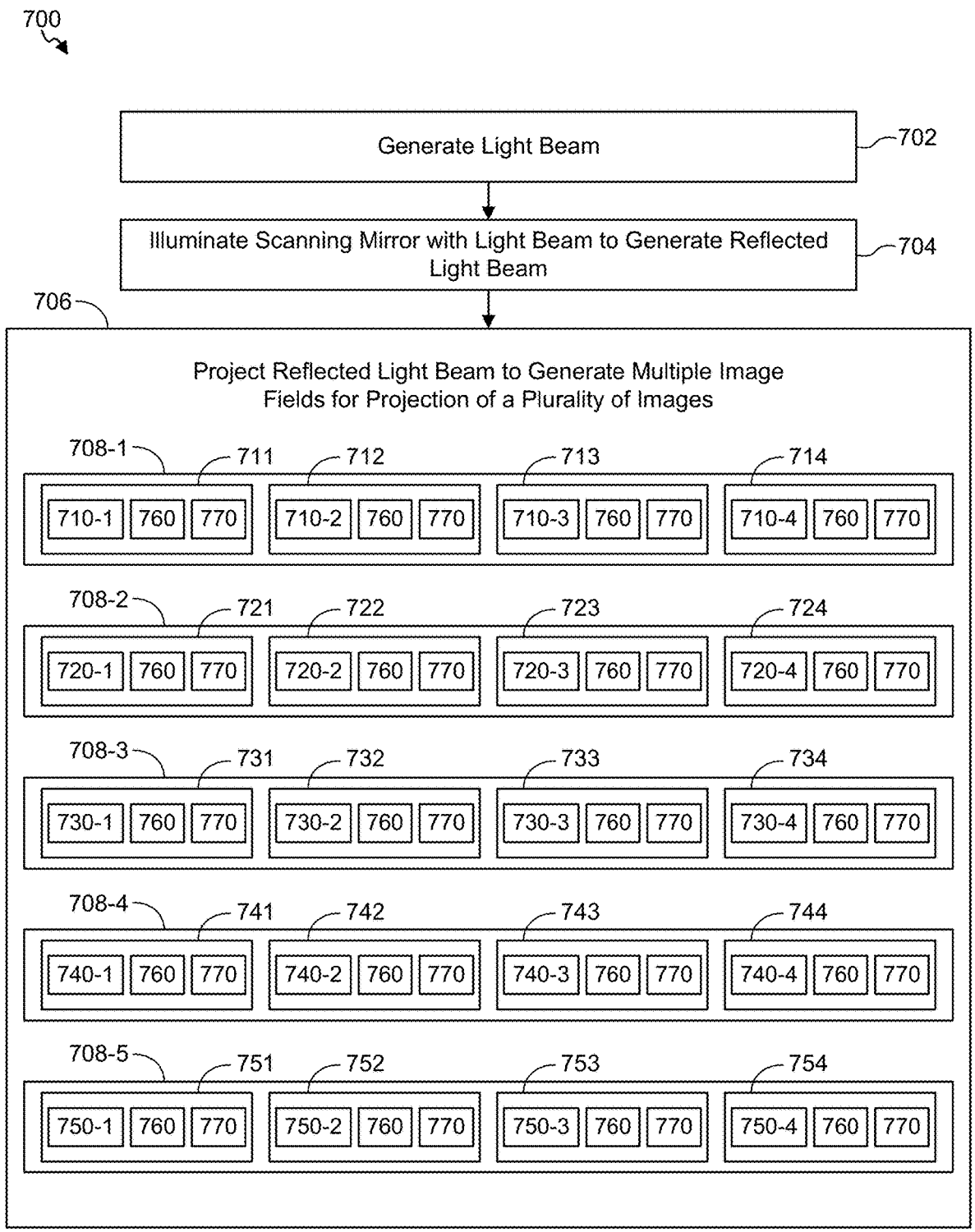
FIG. 7 provides an overview of an example method for projecting an image, in accordance with some embodiments.

FIG. 7 provides an overview of an example method 700 for projecting an image, such as a multiple interlaced image. In some embodiments, image projection methods may be performed, at least in part, by a projection system, which may include a processor for performing processor executable instructions corresponding to various operations of the method. At block 702, a light beam is generated. The light beam may be generated by an optical subsystem of an image projection system, for example. The light beam may be composed of different component color sources, such as red, green, and blue, for generation of a full color image. The light beam may correspond to collimated light, and may be focused. Optionally the light beam comprises laser light, generated from a laser source or multiple laser sources (e.g., red, green, or blue) in the case of a full color image projection system. The light beam may be modulated during emission, such as according to a plurality of images or image fields. Modulation of the light beam is discussed with reference to FIG. 7 in more detail below.

At block 704, a scanning mirror is illuminated by the light beam in order to generate a reflected light beam. The scanning mirror may be used to reflect the light beam for projection onto a projection surface. The scanning mirror may have its orientation changed to direct the light beam to different points on the projection surface. Uniaxial and biaxial scanning mirrors are useful, as described above, and each may include an actuator for adjusting an orientation along the respective axis/axes of the scanning mirror. Example scanning mirrors include microelectromechanical systems (MEMS) mirrors having one or two independently rotatable axes. Example scanning mirrors or sequences of scanning mirrors may allow for oscillation of the reflected light beam in two dimensions, such as along a fast oscillation axis and a slow oscillation axis. In this context, the terms fast and slow are relative terms relating to the relative oscillation frequency between two axes. A fast oscillation axis exhibits an oscillation frequency that is higher than the oscillation frequency of a slow oscillation axis. In some examples, the oscillation frequency of the fast oscillation axis is a harmonic of the oscillation frequency of the slow oscillation axis. Such a configuration may be useful for drawing lines of an image extending across the fast oscillation in sequence along a slow oscillation axis. In some cases, the different axes of a scanning mirror may have independently controllable oscillation rates, which may vary as a function of time, for example. In some implementations, the frequency of oscillation about the fast oscillation axis is substantially equal to the resonant/natural frequency of the scanning mirror or a harmonic thereof.

At block 706, the reflected light beam may be reflected to generate multiple image fields for projection of a plurality of images. For example, the reflected light beam may be used in a multiple interlaced scan configuration to project multiple images in sequence with each image made up of multiple individual image fields projected in sequence. FIG. 7 further includes individual sub-steps of block 706, providing details of projecting five individual images, each comprising four individual image fields in sequence for projection of a series of five 4× interlaced images. Within block 706, individual 4× interlaced images are projected at blocks 708-1, 708-2, 708-3, 708-4 and 708-5.

For the first 4× interlaced image, four individual image fields are projected at blocks 711, 712, 713, and 714. Projection of each image field for the four individual image fields of the first 4× interlaced image includes selecting scan pattern according to a random, pseudo-random, or quasi-random selection scheme (blocks 710-1, 710-2, 710-3, and 710-4) and adjusting the orientation of the scanning mirror according to the selected scan pattern (blocks 760) and modulating the light beam according to an intensity sequence for the selected scan pattern to draw the pixels of the respective image field (blocks 770), which may occur simultaneously within an individual image field projection process (711, 712, 713, or 714). In this way, the scanning mirror can be driven in a sequence of orientations suitable for projecting the reflected light beam onto a projection surface for drawing the different image fields of the first 4× interlaced image while the light beam is modulated.

To complete projection of the other four 4× interlaced images in sequence, the process can be repeated. For the second 4× interlaced image, four individual image fields are projected at blocks 721, 722, 723, and 724, with respective selection of scan patterns according to the random, pseudo-random, or quasi-random selection scheme at blocks 720-1, 720-2, 720-3, and 720-4, orientation of the scanning mirror at blocks 760, and modulation of the light beam at blocks 770. For the third 4× interlaced image, four individual image fields are projected at blocks 731, 732, 733, and 734, with respective selection of scan patterns according to the random, pseudo-random, or quasi-random selection scheme at blocks 730-1, 730-2, 730-3, and 730-4, orientation of the scanning mirror at blocks 760, and modulation of the light beam at blocks 770. For the fourth 4× interlaced image, four individual image fields are projected at blocks 741, 742, 743, and 744, with respective selection of scan patterns according to the random, pseudo-random, or quasi-random selection scheme at blocks 740-1, 740-2, 740-3, and 740-4, orientation of the scanning mirror at blocks 760, and modulation of the light beam at blocks 770. For the fifth 4× interlaced image, four individual image fields are projected at blocks 751, 752, 753, and 754, with respective selection of scan patterns according to the random, pseudo-random, or quasi-random selection scheme at blocks 750-1, 750-2, 750-3, and 720-4, orientation of the scanning mirror at blocks 760, and modulation of the light beam at blocks 770.

For projection of five 4× interlaced images in sequence as described above, at least 20 scan patterns may be used. It will be appreciated that the number of scan patterns used in the example described with reference to FIG. 7 is not intended to be limiting and that, in some cases, fewer or more scan patterns may be used.

A computing device may be incorporated as part of the previously described systems, such as image projection systems. Computing devices may be useful for performing aspects of the previously described methods. For example, computing devices may be useful for controlling modulation of a light beam. Computing devices may also be useful for controlling orientation of a scanning mirror. An example computing device comprises hardware elements that may be electrically coupled via a bus (or may otherwise be in communication). The hardware elements may include one or more processors, including without limitation one or more general-purpose processors and/or one or more special-purpose processors (such as digital signal processing chips, graphics acceleration processors, video decoders, and/or the like); one or more input devices, which may include without limitation a mouse, a touchscreen, keyboard, remote control, voice input, and/or the like; and one or more output devices, which may include without limitation a display device, a printer, speaker, a servo, a linear actuator, a rotational actuator, etc.

The computing device may further include (and/or be in communication with) one or more non-transitory storage devices, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device may also include a communications subsystem, which may include without limitation a modem, a network card (wireless or wired), an infrared communication device, a wireless communication device, and/or a chipset (such as a Bluetooth device, a Bluetooth Low Energy or BLE device, an 802.11 device, an 802.15.4 device, a WiFi device, a WiMax device, cellular communication device, etc.), a G.hn device, and/or the like. The communications subsystem may permit data to be exchanged with a network, other computer systems, and/or any other devices described herein. In many embodiments, the computing device will further comprise a working memory, which may include a RAM or ROM device, as described above.

The computing device also may comprise software elements, shown as being currently located within the working memory, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the methods discussed above may be implemented as code and/or instructions executable by a computer (and/or a processor within a computer); in an aspect, then, such code and/or instructions may be used to configure and/or adapt a computer (or other device) to perform one or more operations in accordance with the described methods.

A set of these instructions and/or code may be stored on a non-transitory computer-readable storage medium, such as the non-transitory storage devices described above. In some cases, the storage medium may be incorporated within a computer system, such as the computing device described above. In other embodiments, the storage medium may be separate from a computer system (e.g., a removable medium, such as a compact disc, or a cloud- or network-based storage system), and/or provided in an installation package, such that the storage medium may be used to program, configure, and/or adapt a computer with the instructions/code stored thereon. These instructions may take the form of executable code, which is executable by the computing device or a component thereof and/or may take the form of source and/or installable code, which, upon compilation and/or installation on the computing device (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware may also be used, and/or particular elements may be implemented in hardware, software (including portable software, such as applets, etc.), or both. Further, connection to other computing devices such as network input/output devices may be employed.

As mentioned above, in one aspect, some embodiments may employ a computing device to perform methods in accordance with various embodiments. According to a set of embodiments, some or all of the procedures of such methods are performed by the computing device in response to a processor executing one or more sequences of one or more instructions (which may be incorporated into the operating system and/or other code, such as an application program) contained in the working memory. Such instructions may be read into the working memory from another computer-readable medium, such as one or more non-transitory storage devices. Merely by way of example, execution of the sequences of instructions contained in the working memory may cause the processor to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device, various computer-readable media may be involved in providing instructions/code to a processor for execution and/or may be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as a non-transitory storage device. Volatile media include, without limitation, dynamic memory, such as the working memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computing device.

The communications subsystem (and/or components thereof) generally will receive signals, and the bus then may carry the signals (and/or the data, instructions, etc. carried by the signals) to the working memory, from which the processor retrieves and executes the instructions. The instructions received by the working memory may optionally be stored on a non-transitory storage device either before or after execution by the processor.

It should further be understood that the components of computing device may be distributed. For example, some processing may be performed in one location using a first processor while other processing may be performed by another processor remote from the first processor. Optionally, systems described herein may include multiple independent processors that may exchange instructions or issue commands or provide data to one another. Other components of computing device may be similarly distributed. As such, a computing device may be interpreted as a distributed computing system that performs processing in multiple locations. In some instances, a computing device may be interpreted as a single computing device, such as a distinct laptop, desktop computer, or the like, depending on the context.

The inventions described herein may be further understood by reference to the following non-limiting examples. As used below, any reference to a series of examples is to be understood as a reference to each of those examples disjunctively (e.g., "Examples 1-4" is to be understood as "Examples 1, 2, 3, or 4").

Example 1 is an image projection system, comprising: an optical subsystem for emitting a modulated light beam, wherein the modulated light beam is modulated according to a plurality of image fields in sequence; a scanning mirror positioned to intercept the modulated light beam and generate a reflected light beam, wherein the scanning mirror includes an actuator configured to adjust an orientation of the scanning mirror according to a sequence of scan patterns, wherein the sequence of scan patterns corresponds to a randomly selected scan pattern sequence of a plurality of different scan patterns, to a pseudo-randomly selected scan pattern sequence of the plurality of different scan patterns, or to a quasi-randomly selected scan pattern sequence of the plurality of different scan patterns; and projection optics positioned to receive the reflected light beam and project a plurality of images in sequence, wherein each image of the plurality of images comprises multiple image fields.

Example 2 is the image projection system of example 1, wherein the optical subsystem includes one or more laser sources.

Example 3 is the image projection system of examples 1-2, wherein the scanning mirror comprises a microelectromechanical system (MEMS) mirror having two independently rotatable axes.

Example 4 is the image projection system of examples 1-3, wherein the scanning mirror comprises two microelectromechanical system (MEMS) mirrors in sequence, wherein each MEMS mirror has one rotatable axis.

Example 5 is the image projection system of examples 1-4, wherein the scanning mirror has a fast oscillation axis and a slow oscillation axis.

Example 6 is the image projection system of examples 1-5, wherein the projection optics include one or more lenses, mirrors, beam splitters, filters, prisms, polarizers, waveguides, diffractive optical elements, windows, or any combination of these.

Example 7 is the image projection system of examples 1-6, wherein each image of the plurality of images is generated by projecting four image fields in sequence.

Example 8 is the image projection system of examples 1-7, wherein each scan pattern corresponds to an orientation sequence for the scanning mirror for projecting the reflected light beam along a path corresponding to an image field.

Example 9 is the image projection system of examples 1-8, wherein the plurality of different scan patterns includes a fixed number of different scan patterns, and wherein the fixed number is an integer multiple of a number of image fields that together make up one image.

Example 10 is the image projection system of examples 1-9, wherein the plurality of different scan patterns includes twenty different scan patterns.

Example 11 is the image projection system of examples 1-10, wherein the actuator is configured to: adjust the orientation of the scanning mirror according to a first scan pattern of the plurality of different scan patterns while the modulated light beam is modulated according to a first image field; adjust the orientation of the scanning mirror according to a second scan pattern of the plurality of different scan patterns while the modulated light beam is modulated according to a second image field; adjust the orientation of the scanning mirror according to a third scan pattern of the plurality of different scan patterns while the modulated light beam is modulated according to a third image field; and adjust the orientation of the scanning mirror according to a fourth scan pattern of the plurality of different scan patterns while the modulated light beam is modulated according to a fourth image field, wherein the first scan pattern, the second scan pattern, the third scan pattern, and the fourth scan pattern are different.

Example 12 is the image projection system of example 11, wherein the first image field, the second image field, the third image field and the fourth image field are generated from a rendered frame corresponding to a first image of the plurality of images.

Example 13 is the image projection system of examples 1-12, wherein the pseudo-randomly or quasi-randomly selected scan pattern sequence corresponds to a sequence of the plurality of different scan patterns that repeats after multiple images of the plurality of images are projected.

Example 14 is a method for projecting an image, the method comprising: generating a modulated light beam, wherein the modulated light beam is modulated according to a plurality of image fields in sequence; illuminating a scanning mirror with the modulated light beam to generate a reflected light beam; and projecting the reflected light beam to generate a plurality of images, wherein each image of the plurality of images is generated by projecting multiple image fields of the plurality of image fields in sequence, and wherein projecting each image field of the plurality of image fields includes adjusting an orientation of the scanning mirror according to a randomly selected scan pattern sequence of a plurality of different scan patterns, according to a pseudo-randomly selected scan pattern sequence of the plurality of different scan patterns, or according to a quasi-randomly selected scan pattern sequence of the plurality of different scan patterns.

Example 15 is the method of example 14, wherein the modulated light beam is generated by an optical subsystem including one or more laser sources.

Example 16 is the method of example 14-15, wherein the scanning mirror comprises a microelectromechanical system (MEMS) mirror having two independently rotatable axes.

Example 17 is the method of example 14-16, wherein the scanning mirror comprises two microelectromechanical system (MEMS) mirrors in sequence, wherein each MEMS mirror has one rotatable axis.

Example 18 is the method of example 14-17, wherein the scanning mirror has a fast oscillation axis and a slow oscillation axis.

Example 19 is the method of example(s) 14-18, wherein the reflected light beam is projected using projection optics including one or more lenses, mirrors, beam splitters, filters, prisms, polarizers, waveguides, diffractive optical elements, windows, or any combination of these.

Example 20 is the method of examples 14-19, wherein each image of the plurality of images is generated by projecting four image fields in sequence.

Example 21 is the method of examples 14-20, wherein each scan pattern corresponds to an orientation sequence for the scanning mirror for projecting the reflected light beam along a path corresponding to an image field.

Example 22 is the method of examples 14-21, wherein the plurality of different scan patterns includes a fixed number of different scan patterns, and wherein the fixed number is an integer multiple of a number of image fields that together make up one image.

Example 23 is the method of examples 14-22, wherein the plurality of different scan patterns includes twenty different scan patterns.

Example 24 is the method of examples 14-23, wherein generating a first image of the plurality of images includes: adjusting the orientation of the scanning mirror according to a first scan pattern of the plurality of different scan patterns while the modulated light beam is modulated according to a first image field; adjusting the orientation of the scanning mirror according to a second scan pattern of the plurality of different scan patterns while the modulated light beam is modulated according to a second image field; adjusting the orientation of the scanning mirror according to a third scan pattern of the plurality of different scan patterns while the modulated light beam is modulated according to a third image field; and adjusting the orientation of the scanning mirror according to a fourth scan pattern of the plurality of different scan patterns while the modulated light beam is modulated according to a fourth image field, wherein the first scan pattern, the second scan pattern, the third scan pattern, and the fourth scan pattern are different.

Example 25 is the method of example 24, wherein the first image field, the second image field, the third image field and the fourth image field are generated from a rendered frame corresponding to the first image.

Example 26 is the method of examples 24-25, wherein the pseudo-randomly or quasi-randomly selected scan pattern sequence corresponds to a sequence of the plurality of different scan patterns that repeats after multiple images of the plurality of images are projected.

Example 27 is a computer program product comprising a non-transitory computer readable storage medium including instructions that, when executed by one or more processors, cause the one or more processors to perform operations including: controlling an optical subsystem so that the optical subsystem emits a modulated light beam modulated according to a plurality of image fields in sequence; and adjusting an orientation of a scanning mirror positioned to intercept the modulated light beam and generate a reflected light beam, wherein adjusting the orientation of the scanning mirror includes actuating an actuator of the scanning mirror according to sequence of scan patterns, wherein the sequence of scan patterns corresponds to a randomly selected scan pattern sequence of a plurality of different scan patterns, to a pseudo-randomly selected scan pattern sequence of the plurality of different scan patterns, or to a quasi-randomly selected scan pattern sequence of the plurality of different scan patterns in order to direct reflected light through projection optics and project a plurality of images, wherein multiple image fields of the plurality of image fields together correspond to an image of the plurality of images.

Example 27a is a computer program product comprising a non-transitory computer readable storage medium including instructions that, when executed by one or more processors, cause the one or more processors to perform the method of examples 1-26.

Example 28 is an image projection system comprising: an illumination source configured to emit collimated light; a scanning mirror configured to receive and reflect light from the illumination source, wherein the scanning mirror includes an actuator controllable to induce movement in the scanning mirror about one or more rotational axes thereof to adjust an orientation of the scanning mirror in accordance with one or more scan patterns; a viewing assembly comprising one or more optical components configured to receive and redirect light reflected by the scanning mirror to a user; and control circuitry operatively coupled to the illumination source and the scanning mirror, the control circuitry configured to display a sequence of a plurality of images of virtual content to the user through the viewing assembly by: identifying, from among a set of multiple different scan patterns, a plurality of scan patterns for the plurality of images of virtual content in the sequence, respectively, including at least one scan pattern for each of the plurality of images of virtual content in the sequence; and synchronously controlling the illumination source to emit collimated light corresponding to pixels of the plurality of images of virtual content in the sequence, and the actuator of the scanning mirror to induce a sequence of different movements in the scanning mirror about the one or more rotational axes in accordance with the plurality of scan patterns identified for the plurality of images of virtual content in the sequence, respectively, wherein the sequence of different movements comprises a sequence of different oscillations in the scanning mirror about a first rotational axis of the one or more rotational axes, and wherein the different oscillations in the sequence are offset in phase from each other.

Example 29 is the image projection system of example 28, wherein: the set of multiple different scan patterns comprises a set of k different scan patterns, k representing a value greater than two, wherein the plurality of images in the sequence are displayed using a quantity of m different scan patterns, m representing a value greater than one and less than or equal to k, the control circuitry is configured to control the actuator of the scanning mirror to induce a sequence of m different oscillations in the scanning mirror about the first rotational axis in accordance with each of the plurality of scan patterns identified for the plurality of images of virtual content in the sequence, respectively, and the m different oscillations are offset in phase from each other by a minimum of about $2\pi/k$ radians.

Example 30 is the image projection system of example 29, wherein: the set of k different scan patterns includes a quantity of n different scan patterns identified for each of the plurality of images of virtual content in the sequence, n representing a value greater than one, and the control circuitry is configured to control the actuator of the scanning mirror to induce a sequence of n different oscillations in the scanning mirror about the first rotational axis in accordance with the quantity of n scan patterns identified for each of the m different images of virtual content in the sequence, the n different oscillations being offset in phase from each other by a minimum of about $2\pi/k$ radians.

Example 31 is the image projection system of example 30, wherein the n different oscillations are offset in phase from each other by about $2\pi/n$ radians.

Example 32 is the image projection system of examples 30-31, wherein each oscillation induced in the scanning mirror about the first rotational axis in accordance with one of the k different scan patterns comprises oscillation about the first rotational axis at a particular frequency, the particular frequency being common across all oscillations induced in the scanning mirror about the first rotational axis in accordance with one of the k different scan patterns.

Example 33 is the image projection system of examples 30-32, wherein each oscillation induced in the scanning mirror about the first rotational axis thereof in accordance with one of the k different scan patterns comprises oscillation about the first rotational axis of the scanning mirror for a particular duration of time, the particular duration of time being common across all oscillations induced in the scanning mirror about the first rotational axis in accordance with one of the k different scan patterns.

Example 34 is the image projection system of examples 30-33, wherein then different scan patterns correspond to n different fields of each of the plurality of images of virtual content in the sequence.

Example 35 is the image projection system of examples 30-34, wherein n represents a value greater than or equal to four.

Example 36 is the image projection system of examples 29-35, wherein k represents a value greater than or equal to twenty.

Example 37 is the image projection system of examples 28-36, wherein the sequence of different movements further comprises a second sequence of different oscillations in the scanning mirror about a second rotational axis of the one or more rotational axes, wherein the second rotational axis is orthogonal to the first rotational axis.

Example 38 is the image projection system of example 37, wherein each movement in the sequence of different movements comprises oscillation about the first rotational axis at a first frequency, and wherein each movement in the sequence of different movements comprises oscillation about the second rotational axis at a second frequency, wherein the second frequency is different from the first frequency.

Example 39 is the image projection system of example 38, wherein the first frequency is greater than the second frequency.

Example 40 is the image projection system of example 39, wherein the first frequency is substantially equivalent to a harmonic of the second frequency.

Example 41 is the image projection system of examples 39-40, wherein the first frequency is substantially equivalent to a natural frequency of the scanning mirror.

Example 42 is the image projection system of examples 39-41, wherein controlling the actuator of the scanning mirror to induce the sequence of different movements includes applying one or more electrical driving signals to the actuator.

Example 43 is the image projection system of example 42, wherein the one or more electrical driving signals include at least one oscillating electrical driving signal or component thereof centered at the first frequency to induce oscillation in the scanning mirror about the first rotational axis.

Example 44 is the image projection system of example 43, wherein the different oscillating electrical driving signals of the one or more electrical driving signals are offset in phase from each other.

Example 45 is the image projection system of examples 43-44, wherein the one or more electrical driving signals further include at least one oscillating electrical driving signal or component thereof centered at the second frequency to induce oscillation in the scanning mirror about the second rotational axis.

Example 46 is the image projection system of examples 28-45, wherein the illumination source includes one or more laser sources.

Example 47 is the image projection system of examples 28-46, wherein the scanning mirror comprises a microelectromechanical system (MEMS) mirror.

Example 48 is the image projection system of examples 28-47, wherein the one or more optical components of the viewing assembly include one or more lenses, mirrors, beam splitters, filters, prisms, polarizers, waveguides, diffractive optical elements, windows, or any combination of these.

Example 49 is the image projection system of examples 28-48, wherein identifying the plurality of scan patterns includes: identifying, from among the set of multiple different scan patterns, the plurality of scan patterns previously used by the control circuitry to display images of virtual content.

Example 50 is the image projection system of examples 28-49, wherein the plurality of scan patterns are identified in a pseudo- or quasi-random manner for the plurality of images of virtual content in the sequence, respectively.

Example 51 is the image projection system of examples 28-50, wherein identifying, from among the set of multiple different scan patterns, the plurality of scan patterns for the plurality of images of virtual content in the sequence includes: selecting, from among the set of multiple different scan patterns, a plurality of scan patterns for the plurality of images of virtual content in the sequence, respectively, in a pseudo- or quasi-random manner.

Example 52 is a method for displaying a sequence of a plurality of images of virtual content through a viewing assembly of an image projection system, the method comprising: identifying, from among a set of multiple different scan patterns, a plurality of scan patterns for the plurality of images of virtual content in the sequence, respectively, including at least one scan pattern for each of the plurality of images of virtual content in the sequence; and synchronously controlling: an illumination source of the image projection system to emit collimated light corresponding to pixels of the plurality of images of virtual content in the sequence toward a scanning mirror of the image projection system, wherein the scanning mirror is positioned to receive and reflect light from the illumination source toward the viewing assembly of the image projection system; and an actuator of the scanning mirror to induce a sequence of different movements in the scanning mirror about one or more rotational axes in accordance with the plurality of scan patterns identified for the plurality of images of virtual content in the sequence, respectively, wherein the sequence of different movements comprises a sequence of different oscillations in the scanning mirror about a first rotational axis of the one or more rotational axes, and wherein the different oscillations in the sequence are offset in phase from each other.

Example 53 is the method of example 52, wherein: the set of multiple different scan patterns comprises a set of k different scan patterns, k representing a value greater than two, wherein the plurality of images in the sequence are displayed using a quantity of m different scan patterns, m representing a value greater than one and less than or equal to k, the method further comprising controlling the actuator of the scanning mirror to induce a sequence of m different oscillations in the scanning mirror about the first rotational axis in accordance with each of the plurality of scan patterns identified for the plurality of images of virtual content in the sequence, respectively, and the m different oscillations are offset in phase from each other by a minimum of about $2\pi/k$ radians.

Example 54 is the method of example 53, wherein: the set of k different scan patterns includes a quantity of n different scan patterns identified for each of the plurality of images of virtual content in the sequence, n representing a value greater than one, and the method further comprising controlling the actuator of the scanning mirror to induce a sequence of n different oscillations in the scanning mirror about the first rotational axis in accordance with the quantity of n scan patterns identified for each of the m different images of virtual content in the sequence, the n different oscillations being offset in phase from each other by a minimum of about $2\pi/k$ radians.

Example 55 is the method of example 54, wherein the n different oscillations are offset in phase from each other by about $2\pi/Cn$ radians.

Example 56 is the method of examples 54-55, wherein each oscillation induced in the scanning mirror about the first rotational axis in accordance with one of the k different scan patterns comprises oscillation about the first rotational axis at a particular frequency, the particular frequency being common across all oscillations induced in the scanning mirror about the first rotational axis in accordance with one of the k different scan patterns.

Example 57 is the method of examples 54-56, wherein each oscillation induced in the scanning mirror about the first rotational axis thereof in accordance with one of the k different scan patterns comprises oscillation about the first rotational axis of the scanning mirror for a particular duration of time, the particular duration of time being common across all oscillations induced in the scanning mirror about the first rotational axis in accordance with one of the k different scan patterns.

Example 58 is the method of examples 54-57, wherein the n different scan patterns correspond to n different fields of each of the plurality of images of virtual content in the sequence.

Example 59 is the method of examples 54-58, wherein n represents a value greater than or equal to four.

Example 60 is the method of examples 53-59, wherein k represents a value greater than or equal to twenty.

Example 61 is the method of examples 52-60, wherein the sequence of different movements further comprises a second sequence of different oscillations in the scanning mirror about a second rotational axis of the one or more rotational axes, wherein the second rotational axis is orthogonal to the first rotational axis.

Example 62 is the method of example 61, wherein each movement in the sequence of different movements comprises oscillation about the first rotational axis at a first frequency, and wherein each movement in the sequence of different movements comprises oscillation about the second rotational axis at a second frequency, wherein the second frequency is different from the first frequency.

Example 63 is the method of example 62, wherein the first frequency is greater than the second frequency.

Example 64 is the method of example 63, wherein the first frequency is substantially equivalent to a harmonic of the second frequency.

Example 65 is the method of examples 63-64, wherein the first frequency is substantially equivalent to a natural frequency of the scanning mirror.

Example 66 is the method of examples 63-65, wherein controlling the actuator of the scanning mirror to induce the sequence of different movements includes applying one or more electrical driving signals to the actuator.

Example 67 is the method of example 66, wherein the one or more electrical driving signals include at least one oscillating electrical driving signal or component thereof centered at the first frequency to induce oscillation in the scanning mirror about the first rotational axis.

Example 68 is the method of example 67, wherein the different oscillating electrical driving signals of the one or more electrical driving signals are offset in phase from each other.

Example 69 is the method of examples 67-68, wherein the one or more electrical driving signals further include at least one oscillating electrical driving signal or component thereof centered at the second frequency to induce oscillation in the scanning mirror about the second rotational axis.

Example 70 is the method of examples 52-69, wherein the illumination source includes one or more laser sources.

Example 71 is the method of examples 52-70, wherein the scanning mirror comprises a microelectromechanical system (MEMS) mirror.

Example 72 is the method of examples 52-71, wherein the one or more optical components of the viewing assembly include one or more lenses, mirrors, beam splitters, filters, prisms, polarizers, waveguides, diffractive optical elements, windows, or any combination of these.

Example 73 is the method of examples 52-72, wherein identifying the plurality of scan patterns includes: identifying, from among the set of multiple different scan patterns, the plurality of scan patterns previously used to display images of virtual content.

Example 74 is the method of examples 52-73, wherein the plurality of scan patterns are identified in a pseudo- or quasi-random manner for the plurality of images of virtual content in the sequence, respectively.

Example 75 is the method of examples 52-74, wherein identifying, from among the set of multiple different scan patterns, the plurality of scan patterns for the plurality of images of virtual content in the sequence includes: selecting, from among the set of multiple different scan patterns, a plurality of scan patterns for the plurality of images of virtual content in the sequence, respectively, in a pseudo- or quasi-random manner.

Example 76 is a computer program product comprising a non-transitory computer readable storage medium including instructions that, when executed by one or more processors, cause the one or more processors to perform the method of examples 52-75.

Example 77 is a computer program product comprising a non-transitory computer readable storage medium including instructions that, when executed by one or more processors, cause the one or more processors to perform operations including identifying, from among a set of multiple different scan patterns, a plurality of scan patterns for the plurality of images of virtual content in the sequence, respectively, including at least one scan pattern for each of the plurality of images of virtual content in the sequence; and synchronously controlling: an illumination source of the image projection system to emit collimated light corresponding to pixels of the plurality of images of virtual content in the sequence toward a scanning mirror of the image projection system, wherein the scanning mirror is positioned to receive and reflect light from the illumination source toward the viewing assembly of the image projection system; and an actuator of the scanning mirror to induce a sequence of different movements in the scanning mirror about one or more rotational axes in accordance with the plurality of scan patterns identified for the plurality of images of virtual content in the sequence, respectively, wherein the sequence of different movements comprises a sequence of different oscillations in the scanning mirror about a first rotational axis of the one or more rotational axes, and wherein the different oscillations in the sequence are offset in phase from each other.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An image projection system, comprising:
   an optical subsystem for emitting a modulated light beam, wherein the modulated light beam is modulated according to a plurality of image fields in sequence;
   a scanning mirror positioned to intercept the modulated light beam and generate a reflected light beam, wherein the scanning mirror includes an actuator configured to adjust an orientation of the scanning mirror according to a sequence of scan patterns, wherein the sequence of scan patterns corresponds to:
      a randomly selected scan pattern sequence of a plurality of different scan patterns;
      a pseudo-randomly selected scan pattern sequence of the plurality of different scan patterns; or
      a quasi-randomly selected scan pattern sequence of the plurality of different scan patterns; and
   projection optics positioned to receive the reflected light beam and project a plurality of images in sequence, wherein each image of the plurality of images comprises multiple image fields of the plurality of image fields;
   wherein each scan pattern of the sequence of scan patterns is (i) randomly selected, pseudo-randomly selected, or quasi-randomly selected from a fixed number of different scan patterns in the plurality of different scan patterns, and is (ii) phase shifted relative to each other scan pattern of the plurality of different scan patterns.

2. The image projection system of claim 1, wherein the optical subsystem includes one or more laser sources.

3. The image projection system of claim 1, wherein the scanning mirror comprises a microelectromechanical system (MEMS) mirror having two independently rotatable axes.

4. The image projection system of claim 1, wherein the scanning mirror comprises two microelectromechanical system (MEMS) mirrors in sequence, wherein each MEMS mirror has one rotatable axis.

5. The image projection system of claim 1, wherein the scanning mirror has a fast oscillation axis and a slow oscillation axis.

6. The image projection system of claim 1, wherein the projection optics include one or more lenses, mirrors, beam splitters, filters, prisms, polarizers, waveguides, diffractive optical elements, or windows.

7. The image projection system of claim 1, wherein each image of the plurality of images is generated by projecting four image fields in sequence.

8. The image projection system of claim 1, wherein each scan pattern corresponds to an orientation sequence for the scanning mirror for projecting the reflected light beam along a path corresponding to an image field.

9. The image projection system of claim 1, wherein the fixed number is an integer multiple of a number of image fields that together make up one image.

10. The image projection system of claim 1, wherein the plurality of different scan patterns includes twenty different scan patterns.

11. The image projection system of claim 1, wherein the actuator is configured to:
    adjust the orientation of the scanning mirror according to a first scan pattern of the plurality of different scan patterns while the modulated light beam is modulated according to a first image field;
    adjust the orientation of the scanning mirror according to a second scan pattern of the plurality of different scan patterns while the modulated light beam is modulated according to a second image field;
    adjust the orientation of the scanning mirror according to a third scan pattern of the plurality of different scan patterns while the modulated light beam is modulated according to a third image field; and
    adjust the orientation of the scanning mirror according to a fourth scan pattern of the plurality of different scan patterns while the modulated light beam is modulated according to a fourth image field, wherein the first scan pattern, the second scan pattern, the third scan pattern, and the fourth scan pattern are different.

12. The image projection system of claim 11, wherein the first image field, the second image field, the third image field and the fourth image field are generated from a rendered frame corresponding to a first image of the plurality of images.

13. The image projection system of claim 1, wherein the pseudo-randomly selected scan pattern sequence or the quasi-randomly selected scan pattern sequence corresponds to a sequence of the plurality of different scan patterns that repeats after multiple images of the plurality of images are projected.

14. A method for projecting an image, the method comprising:
    generating a modulated light beam, wherein the modulated light beam is modulated according to a plurality of image fields in sequence;
    illuminating a scanning mirror with the modulated light beam to generate a reflected light beam; and
    projecting the reflected light beam to generate a plurality of images, wherein each image of the plurality of images is generated by projecting multiple image fields of the plurality of image fields in sequence, and wherein projecting each image field of the plurality of image fields includes adjusting an orientation of the scanning mirror according to a sequence of scan patterns corresponding to:
        a randomly selected scan pattern sequence of a plurality of different scan patterns;
        a pseudo-randomly selected scan pattern sequence of the plurality of different scan patterns; or a quasi-randomly selected scan pattern sequence of the plurality of different scan patterns;
wherein each scan pattern of the sequence of scan patterns is (i) randomly selected, pseudo-randomly selected, or quasi-randomly selected from a fixed number of different scan patterns in the plurality of different scan patterns, and is (ii) phase shifted relative to each other scan pattern of the plurality of different scan patterns.

15. The method of claim 14, wherein the fixed number is an integer multiple of a number of image fields that together make up one image.

16. The method of claim 14, wherein generating a first image of the plurality of images includes:
adjusting the orientation of the scanning mirror according to a first scan pattern of the plurality of different scan patterns while the modulated light beam is modulated according to a first image field;
adjusting the orientation of the scanning mirror according to a second scan pattern of the plurality of different scan patterns while the modulated light beam is modulated according to a second image field;
adjusting the orientation of the scanning mirror according to a third scan pattern of the plurality of different scan patterns while the modulated light beam is modulated according to a third image field; and
adjusting the orientation of the scanning mirror according to a fourth scan pattern of the plurality of different scan patterns while the modulated light beam is modulated according to a fourth image field, wherein the first scan pattern, the second scan pattern, the third scan pattern, and the fourth scan pattern are different.

17. The method of claim 14, wherein the scanning mirror comprises a microelectromechanical system (MEMS) mirror having two independently rotatable axes.

18. The method of claim 14, wherein the scanning mirror comprises two microelectromechanical system (MEMS) mirrors in sequence, wherein each of the two MEMS mirrors has one rotatable axis.

19. The method of claim 14, wherein the multiple image fields of the plurality of image fields comprises four image fields.

20. The method of claim 14, further comprising repeating either the pseudo-randomly selected scan pattern sequence or the quasi-randomly selected scan pattern sequence after projecting multiple images of the plurality of images.

* * * * *